US010252414B2

(12) United States Patent
Kondo et al.

(10) Patent No.: US 10,252,414 B2
(45) Date of Patent: Apr. 9, 2019

(54) ROBOT AND PRINTER INCLUDING A TELECENTRIC OPTICAL SYSTEM BETWEEN AN IMAGING ELEMENT AND A MARK OF AN ENCODER

(71) Applicant: Seiko Epson Corporation, Tokyo (JP)

(72) Inventors: Takayuki Kondo, Chino (JP); Daiki Tokushima, Azumino (JP); Hidemitsu Sorimachi, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/956,060

(22) Filed: Apr. 18, 2018

(65) Prior Publication Data

US 2018/0311813 A1 Nov. 1, 2018

(30) Foreign Application Priority Data

Apr. 27, 2017 (JP) .................................. 2017-087981

(51) Int. Cl.
| | | |
|---|---|---|
| *G01D 5/347* | (2006.01) | |
| *B25J 9/00* | (2006.01) | |
| *G01D 5/245* | (2006.01) | |
| *B25J 13/08* | (2006.01) | |
| *B25J 9/04* | (2006.01) | |
| *B25J 19/02* | (2006.01) | |

(52) U.S. Cl.
CPC ............. *B25J 9/0027* (2013.01); *B25J 9/042* (2013.01); *B25J 13/089* (2013.01); *G01D 5/2457* (2013.01); *B25J 19/022* (2013.01); *G01D 5/34707* (2013.01)

(58) Field of Classification Search
CPC ... G01D 5/34707; G01D 5/2457; B25J 9/042; B25J 13/089
USPC ...................................................... 250/231.13
See application file for complete search history.

(56) References Cited

U.S. PATENT DOCUMENTS

| | | | |
|---|---|---|---|
| 4,982,189 A * | 1/1991 | Dammeyer | .......... G01D 5/2457 |
| | | | 341/16 |
| 2004/0218181 A1 | 11/2004 | Jones et al. | |
| 2017/0274537 A1 | 9/2017 | Kondo et al. | |

FOREIGN PATENT DOCUMENTS

| | | |
|---|---|---|
| JP | 63-187118 A | 8/1988 |
| JP | 08-247739 A | 9/1996 |
| JP | 2003-004417 A | 1/2003 |
| JP | 2004-333498 A | 11/2004 |
| JP | 2017-177238 A | 10/2017 |

\* cited by examiner

*Primary Examiner* — Que Tan Le

(74) *Attorney, Agent, or Firm* — Harness, Dickey & Pierce, P.L.C.

(57) ABSTRACT

A robot includes a base, a robot arm provided to be turnable around a turning axis with respect to the base, and an encoder including a mark configured to turn around the turning axis according to the turning of the robot arm and an imaging element configured to image the mark, the encoder detecting a state of the turning of the robot arm using a signal output from the imaging element. The encoder includes a telecentric optical system disposed between the imaging element and the mark.

19 Claims, 17 Drawing Sheets

ROBOT AND PRINTER INCLUDING A TELECENTRIC OPTICAL SYSTEM BETWEEN AN IMAGING ELEMENT AND A MARK OF AN ENCODER

BACKGROUND

1. Technical Field

The present invention relates to a robot and a printer.

2. Related Art

For example, in a robot including a robot arm including a turnable joint section, in general, rotation states such as a rotation angle, a rotation position, the number of rotations, and rotation speed of the joint section are detected by an encoder. Driving of the joint section is controlled on the basis of a result of the detection by the rotation states.

For example, an encoder described in JP-A-63-187118 (Patent Literature 1) reads, with an imaging element, a code plate on which a numerical value pattern such as a gray code and a stripe-like pattern are formed and detects a position from the read numerical value pattern and the read stripe-like pattern.

However, in the encoder described in Patent Literature 1, when the distance between the imaging element and the patterns fluctuates, image forming magnification on the imaging element changes. As a result, deterioration in detection accuracy is caused. For example, when there is an asymmetrical weight distribution with respect to a rotation axis as in a robot arm, the distance between the imaging element and the patterns easily changes. Such a problem is conspicuous.

SUMMARY

An advantage of some aspects of the invention is to provide a robot and a printer that can reduce deterioration in detection accuracy of an encoder.

The invention can be implemented as the following application examples or forms.

A robot according to an application example includes: a base; a robot arm provided to be turnable around a turning axis with respect to the base; and an encoder including a mark configured to turn around the turning axis according to the turning of the robot arm and an imaging element configured to image the mark, the encoder detecting a state of the turning of the robot arm using a signal output from the imaging element. The encoder includes a telecentric optical system disposed between the imaging element and the mark.

With such a robot, since the telecentric optical system (an image forming optical system) is disposed between the imaging element and the mark, even if the distance between the mark and the imaging element fluctuates, it is possible to reduce a change in image forming magnification on the imaging element. As a result, it is possible to reduce deterioration in detection accuracy of the encoder.

A robot according to an application example includes: a robot arm including a first arm and a second arm provided to be turnable around a turning axis with respect to the first arm; and an encoder including a mark configured to turn around the turning axis according to the turning of the second arm and an imaging element configured to image the mark, the encoder detecting a state of the turning of the second arm with respect to the first arm using a signal output from the imaging element. The encoder includes a telecentric optical system disposed between the imaging element and the mark.

With such a robot, since the telecentric optical system (an image forming optical system) is disposed between the imaging element and the mark, even if the distance between the mark and the imaging element fluctuates, it is possible to reduce a change in image forming magnification on the imaging element. As a result, it is possible to reduce deterioration in detection accuracy of the encoder.

In the robot according to the application example, it is preferable that the telecentric optical system is object-side telecentric.

With this configuration, it is possible to use a small number of lenses (e.g., one lens) in the telecentric optical system. As a result, it is possible to achieve a reduction in the cost of the telecentric optical system and a reduction in the cost of the encoder.

In the robot according to the application example, it is preferable that the telecentric optical system is bi-telecentric.

With this configuration, even if the distance between a lens included in the telecentric optical system and the imaging element fluctuates, it is possible to reduce a change in image forming magnification on the imaging element. Therefore, there is an advantage that it is easy to assemble the telecentric optical system.

In the robot according to the application example, it is preferable that the robot further includes light source sections configured to irradiate lights on the mark from directions inclined with respect to an optical axis of the telecentric optical system.

With this configuration, it is possible to improve the contrast of a captured image of the imaging element compared with the case where a coaxial epi-illumination is used. There is also an advantage that the telecentric optical system is small compared with the case where the coaxial epi-illumination is used.

In the robot according to the application example, it is preferable that the light source sections are disposed in a ring shape around the optical axis.

With this configuration, it is possible to uniformly illuminate the mark. As a result, it is possible to improve the quality of the captured image of the imaging element.

In the robot according to the application example, it is preferable that the mark is formed using a pigment.

With this configuration, it is possible to easily form the mark. In general, the pigment contains particles that scatter light. Therefore, when an oblique illumination is used, it is possible to improve the contrast of the captured image of the imaging element.

In the robot according to the application example, it is preferable that the mark is formed using unevenness.

With this configuration, it is possible to improve durability of the mark. When the oblique illumination is used, by scattering light with the unevenness, it is possible to improve the contrast of the captured image of the imaging element.

In the robot according to the application example, it is preferable that the encoder includes light transmissive coating that covers the mark.

With this configuration, it is possible to protect the mark. When the coaxial epi-illumination is used, it is difficult to obtain a captured image having satisfactory contrast. However, when the oblique illumination is used, it is possible to obtain a captured image having satisfactory contrast.

In the robot according to the application example, it is preferable that the mark is present on a surface of the base or the robot arm.

With this configuration, it is unnecessary to separately provide a member for setting the mark. It is possible to reduce the number of components and achieve a reduction in cost.

In the robot according to the application example, it is preferable that the mark is present on a surface of the first arm or the second arm.

With this configuration, it is unnecessary to separately provide a member for setting the mark. It is possible to reduce the number of components and achieve a reduction in cost.

A printer according to an application example includes an encoder including a mark configured to turn around the turning axis and an imaging element configured to image the mark, the encoder detecting a state of the turning around the turning axis using a signal output from the imaging element. The encoder includes a telecentric optical system disposed between the imaging element and the mark.

With such a printer, since the telecentric optical system (an image forming optical system) is disposed between the imaging element and the mark, even if the distance between the mark and the imaging element fluctuates, it is possible to reduce a change in image forming magnification on the imaging element. As a result, it is possible to reduce deterioration in detection accuracy of the encoder.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of a robot and a printer according to the invention are explained in detail below with reference to the accompanying drawings.

First Embodiment

Robot

Figure 1:
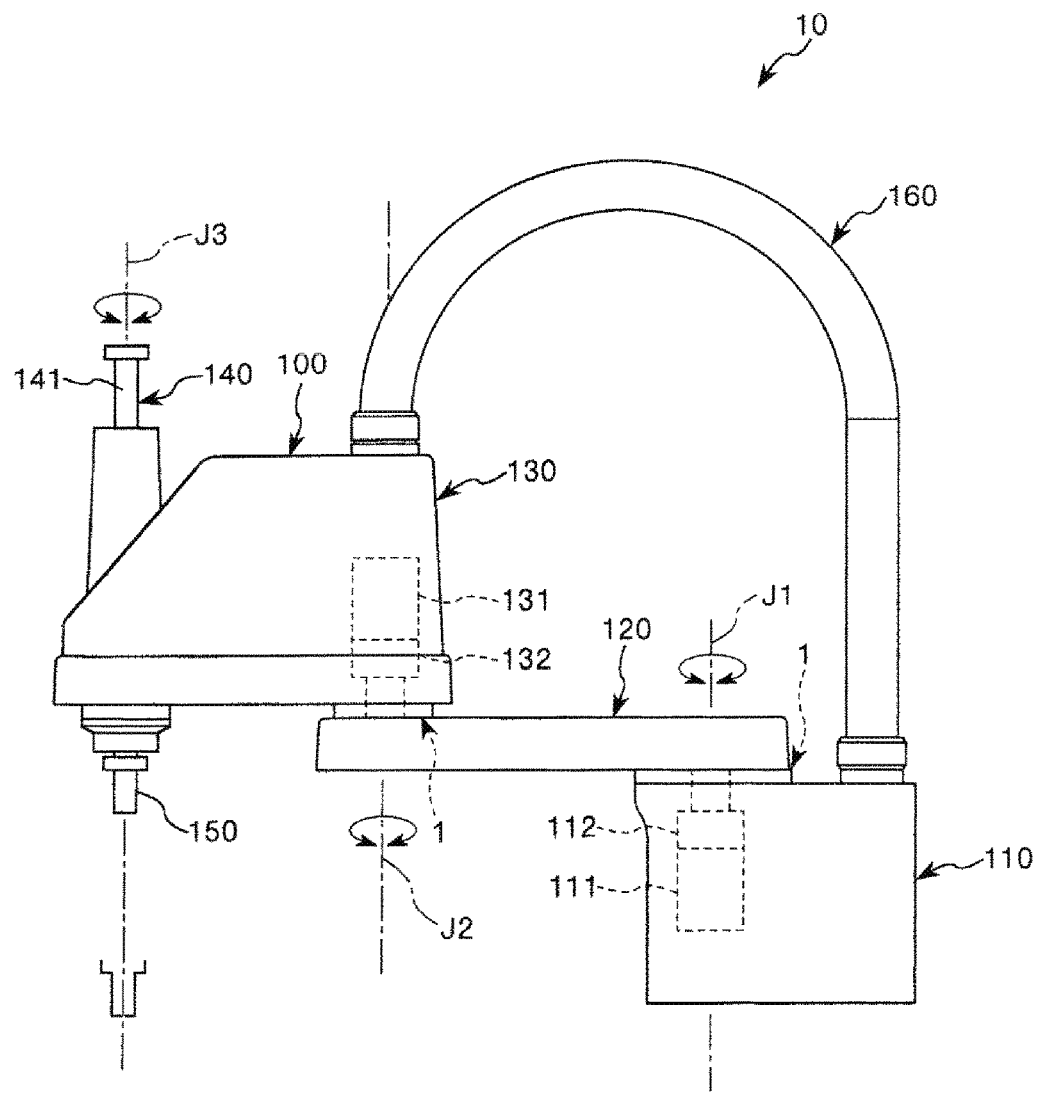
FIG. 1 is a side view showing a robot according to a first embodiment of the invention.

FIG. 1 is a side view showing a robot according to a first embodiment of the invention. Note that, in the following explanation, for convenience of explanation, an upper side in FIG. 1 is referred to as "upper" and a lower side in FIG. 1 is referred to as "lower". A base 110 side in FIG. 1 is referred to as "proximal end side" and the opposite side of the base 110 side (i.e., an end effector 150 side) is referred to as "distal end side". The up-down direction of FIG. 1 is referred to as "vertical direction" and the left-right direction of FIG. 1 is referred to as "horizontal direction".

A robot 10 shown in FIG. 1 is a so-called horizontal articulated robot (a SCARA robot). The robot 10 is used in, for example, a manufacturing process for manufacturing precision instruments and the like. The robot 10 can perform gripping, conveyance, and the like of the precision instruments, components, and the like.

As shown in FIG. 1, the robot 10 includes a base 110, a first arm 120, a second arm 130, a work head 140, an end effector 150, and a wire routing section 160. The first arm 120, the second arm 130, and the work head 140 configure a robot arm 100. The sections of the robot 10 are briefly explained in order below.

The base 110 is fixed to, for example, a not-shown floor surface by bolts and the like. The first arm 120 is coupled to the upper end portion of the base 110. The first arm 120 is turnable around a first axis J1, which extends along the vertical direction, with respect to the base 110.

In the base 110, a first motor 111 configured to generate a driving force for turning the first arm 120 and a first reduction gear 112 configured to reduce the driving force of the first motor 111 are set. An input shaft of the first reduction gear 112 is coupled to a rotating shaft of the first motor 111. An output shaft of the first reduction gear 112 is coupled to the first arm 120. Therefore, when the first motor 111 is driven and the driving force of the first motor 111 is transmitted to the first arm 120 via the first reduction gear 112, the first arm 120 turns in a horizontal plane around the first axis J1 with respect to the base 110. An encoder 1, which is a first encoder configured to detect a turning state of the first arm 120 with respect to the base 110, is provided on the base 110 and the first arm 120.

The second arm 130 is coupled to the distal end portion of the first arm 120. The second arm 130 is turnable around a second axis J2, which extends along the vertical direction, with respect to the first arm 120. In the second arm 130, a second motor 131 configured to generate a driving force for turning the second arm 130 and a second reduction gear 132 configured to reduce the driving force of the second motor 131 are set. The driving force of the second motor 131 is transmitted to the first arm 120 via the second reduction gear 132, whereby the second arm 130 turns in a horizontal plane around the second axis J2 with respect to the first arm 120. The encoder 1, which is a second encoder configured to detect a turning state of the second arm 130 with respect to the first arm 120, is provided on the first arm 120 and the second arm 130.

The work head 140 is disposed at the distal end portion of the second arm 130. The work head 140 includes a spline shaft 141 inserted through a spline nut and a ball screw nut (none of which is shown in FIG. 1) coaxially disposed at the distal end portion of the second arm 130. The spline shaft 141 is rotatable around the axis of the second arm 130 with respect to the second arm 130 and is movable (capable of rising and falling) in the up-down direction.

Although not shown in FIG. 1, a rotating motor and a lifting/lowering motor are disposed in the second arm 130. A driving force of the rotating motor is transmitted to the spline nut by a not-shown driving force transmission mechanism. When the spline nut normally and reversely rotates, the spline shaft 141 normally and reversely rotates around an axis J3, which extends along the vertical direction. Although not shown in FIG. 1, a third encoder configured to detect a turning state of the spline shaft 141 with respect to the second arm 130 is provided in the rotating motor. On the other hand, a driving force of the lifting/lowering motor is transmitted to the ball screw nut by a not-shown driving force transmission mechanism. When the ball screw nut normally and reversely rotates, the spline shaft 141 moves up and down. A fourth encoder configured to detect a movement amount of the spline shaft 141 with respect to the second arm 130 is provided in the lifting/lowering motor.

The end effector 150 is coupled to the distal end portion (the lower end portion) of the spline shaft 141. The end effector 150 is not particularly limited. Examples of the end effector 150 include an end effector that grips a conveyed object and an end effector that machines work.

A plurality of wires connected to the electronic components (e.g., the second motor, the rotating motor, the lifting/lowering motor, and the first to fourth encoders) disposed in the second arm 130 are routed to the inside of the base 110 through the tubular wire routing section 160 configured to couple the second arm 130 and the base 110. Further, the plurality of wires are collected in the base 110 to thereby be routed to a not-shown control device, which is disposed on the outside of the base 110 and controls the robot 10, together with wires connected to the first motor 111 and the encoder 1.

The configuration of the robot 10 is briefly explained above. As explained above, the robot 10 includes the encoder 1 configured to detect a turning state of the first arm 120 with respect to the base 110 and the encoder 1 configured to detect a turning state of the second arm 130 with respect to the first arm 120. The encoder 1 is explained in detail below. Note that, in the following explanation, the encoder 1 configured to detect a turning state of the first arm 120 with respect to the base 110 is representatively explained. Concerning the encoder 1 configured to detect a turning state of the second arm 130 with respect to the first arm 120, explanation is omitted because both the encoders 1 are the same.

Encoder

Figure 2:
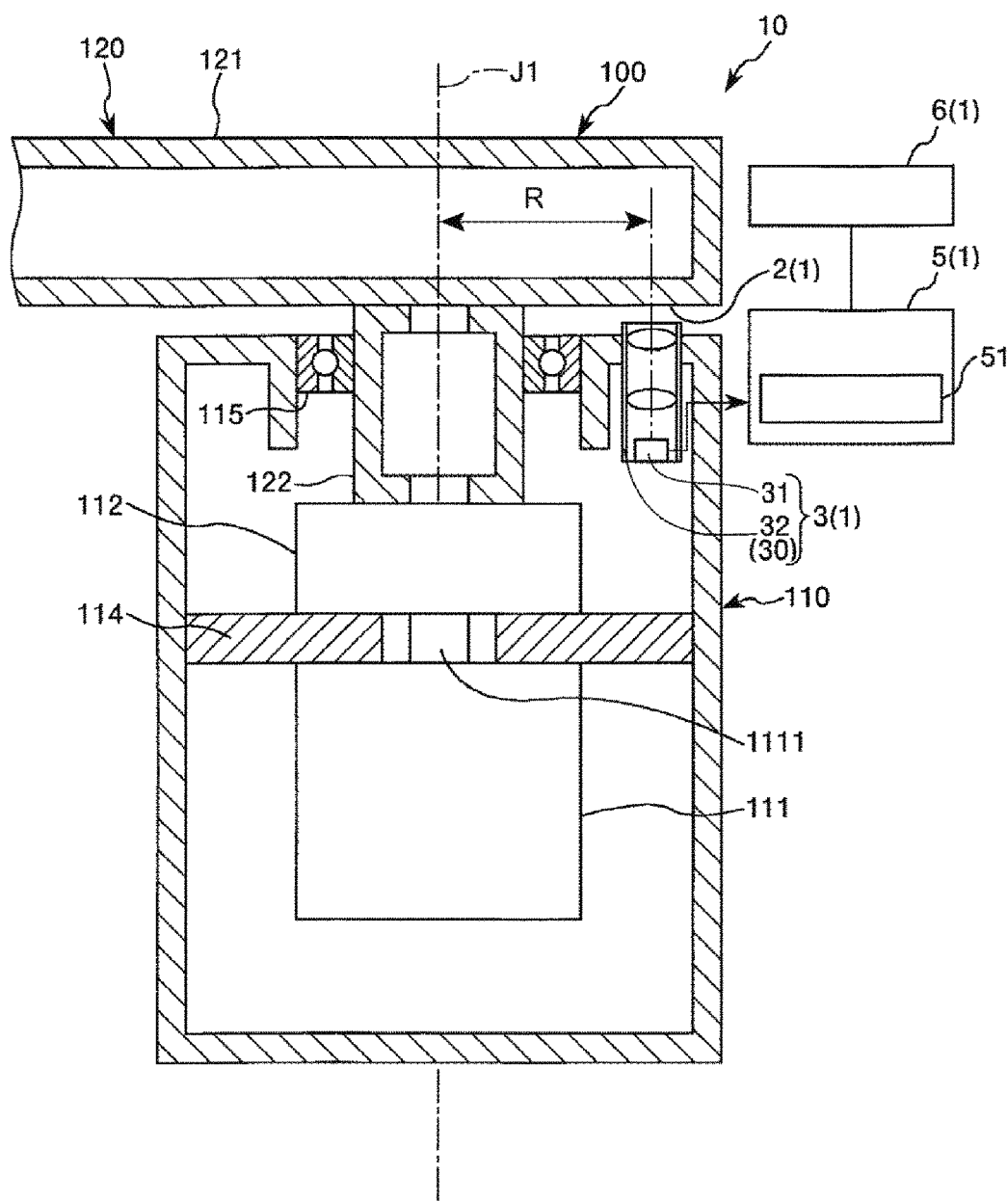
FIG. 2 is a sectional view for explaining an encoder included in the robot shown in FIG. 1.
Figure 3:
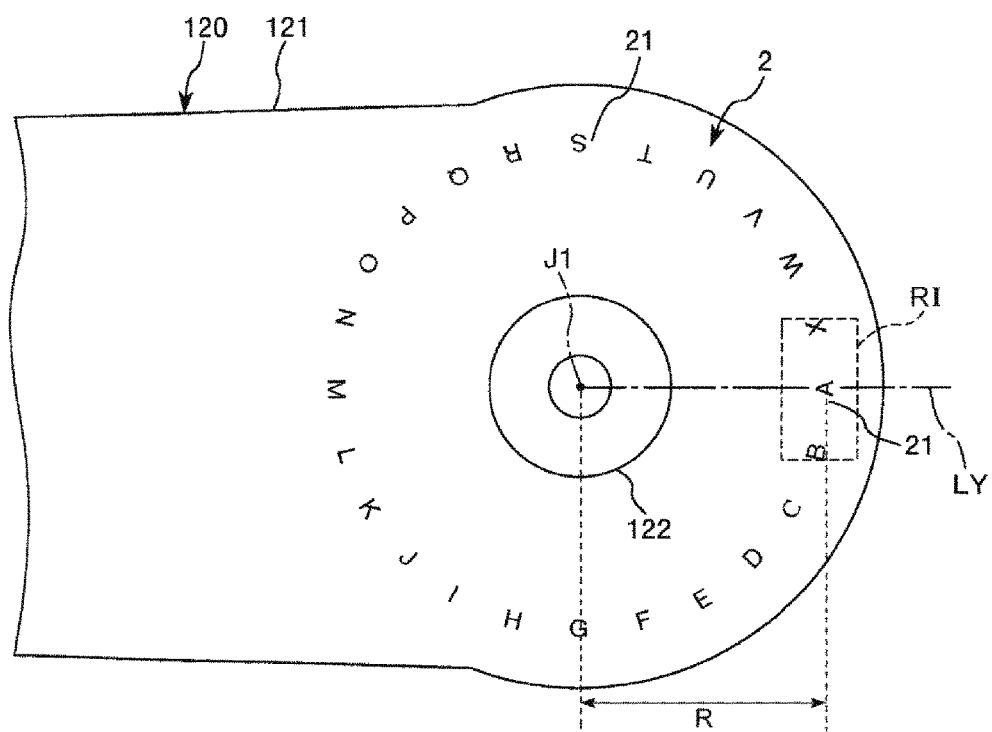
FIG. 3 is a diagram for explaining a mark included in the encoder shown in FIG. 2.

FIG. 2 is a sectional view for explaining the encoder included in the robot shown in FIG. 1. FIG. 3 is a diagram for explaining a mark included in the encoder shown in FIG. 2.

As shown in FIG. 2, the base 110 of the robot 10 includes a supporting member 114 configured to support the first motor 111 and the first reduction gear 112. The base 110 houses the first motor 111 and the first reduction gear 112. The first arm 120 is provided on the base 110 to be turnable around the first axis J1.

The first arm 120 includes an arm body section 121 extending along the horizontal direction and a shaft section 122 projecting downward from the arm body section 121. The arm body section 121 and the shaft section 122 are connected to each other. The shaft section 122 is supported on the base 110 via a bearing 115 to be turnable around the first axis J1 and is connected to the output shaft of the first reduction gear 112. The input shaft of the first reduction gear 112 is connected to a rotating shaft 1111 of the first motor 111.

On the base 110 and the first arm 120 that turn relatively to each other, the encoders 1 configured to detect turning states of the base 110 and the first arm 120 are provided.

The encoder 1 includes a mark section 2 (a scale) provided on the first arm 120, a mark detecting section 3 provided on the base 110 and configured to detect the mark section 2, a determining section 5 configured to determine relative turning states of the base 110 and the first arm 120 on the basis of a result of the detection by the mark detecting section 3, and a storing section 6 electrically connected to the determining section 5.

The mark section 2 is provided in a portion of the arm body section 121 opposed to the base 110, that is, a portion surrounding the shaft section 122 on the lower surface of the arm body section 121. The mark section 2 includes, as shown in FIG. 3, a plurality of marks 21 disposed around the first axis J1 in a position different from the position of the first axis J1. The marks 21 are provided on the surface of the first arm 120. Consequently, a member for providing the marks 21 does not need to be provided separately from the base 110 and the first arm 120. Therefore, it is possible to reduce the number of components.

Note that the marks 21 are not limited to be directly provided on the surface of the first arm 120. For example, the marks 21 may be provided on a sheet-like member stuck to the surface of the first arm 120 or may be provided on a plate-like member provided to turn together with the first arm 120. That is, a member on which the marks 21 are provided only has to be a member that turns around the first axis J1 with respect to the base 110 together with the first arm 120.

In this embodiment, as shown in FIG. 3, the plurality of marks 21 are a plurality of position identification marks different from one another disposed side by side at equal intervals (at equal distances from the first axis J1 or at equal angle intervals) along the circumferential direction on a concentric circle around the first axis J1. The plurality of marks 21 shown in FIG. 3 are alphabets different from one another. In FIG. 3, twenty-four characters of A to X are disposed side by side at equal intervals in the circumferential direction in the alphabet order. Examples of a method of forming the marks 21 include laser marking, printing, cutting, and etching.

Note that the number and the size of the marks 21 are determined according to necessary resolution, the resolution of an imaging element 31 explained below, and the like. The number and the size of the marks 21 are not limited to an example shown in FIG. 3 and may be any number and any size. The intervals in the circumferential direction among the plurality of marks 21 do not have to be the equal intervals. The marks 21 are not limited to the alphabets shown in FIG. 3. For example, numbers may be used, other characters such as Arabic characters or Chinese characters may be used, or symbols, codes, signs, marks, designs, and the like other than characters may be used. The marks 21 only have to be identifiable by the determining section 5 and do not always need to be identifiable by a human. For example, a one-dimensional barcode or a QR code (registered trademark) or a random pattern formed by dots, straight lines, or curves may be used instead of the marks 21.

The mark detecting section 3 shown in FIG. 2 includes an imaging element 31 provided in the base 110 and an optical unit 32 including a telecentric optical system 30 provided in an opening of the base 110. The mark detecting section 3 images, via the telecentric optical system 30, the marks 21 present in a part (an imaging region RI shown in FIG. 3) in the circumferential direction of the mark section 2.

Examples of the imaging element 31 include a CCD (Charge Coupled Device) and a CMOS (Complementary Metal Oxide Semiconductor). The imaging element 31 converts a captured image into an electric signal of each of pixels and outputs the electric signal. As the imaging element 31, both of a two-dimensional imaging element (an area image sensor) and a one-dimensional imaging element (a line image sensor) can be applied. The one-dimensional imaging element is desirably disposed in a direction in which arrangement of the pixels is in contact with a turning circle of the arm. When the two-dimensional imaging element is used, it is possible to acquire a two-dimensional image having a large information amount. It is easy to improve detection accuracy of the marks 21 by template matching explained below. As a result, it is possible to highly accurately detect a turning state of the first arm 120. When the one-dimensional imaging element is used, since an image acquisition cycle, that is, a so-called frame rate is high, it is possible to increase a detection frequency. This is advantageous during high-speed operation.

The telecentric optical system 30 included in the optical unit 32 is an image forming optical system disposed between the marks 21 and the imaging element 31. At least an object side (the mark 21 side) of the telecentric optical system 30 is telecentric. Consequently, even if the distance between the marks 21 and the imaging element 31 fluctuates, it is possible to reduce a change in image forming magnification on the imaging element 31. As a result, it is possible to reduce deterioration in detection accuracy of the encoder 1. In particular, the telecentric optical system 30 in this embodiment is bi-telecentric. Consequently, even if the distance between a lens included in the telecentric optical system 30 and the imaging element 31 fluctuates, it is possible to reduce a change in the image forming magnification on the imaging element 31. Therefore, there is an advantage that it is easy to assemble the telecentric optical system 30. Note that the configurations of the telecentric optical system 30 and the optical unit 32 are explained in detail below.

As shown in FIG. 3, the imaging region RI of the imaging element 31 is set on the lower surface of the first arm 120 to overlap a part in the circumferential direction of the mark section 2. Consequently, the imaging element 31 can image the marks 21 present in the imaging region RI. Therefore, it is possible to learn a turning state of the first arm 120 by reading the marks 21 located in the imaging region RI.

The determining section 5 shown in FIG. 2 determines relative turning states of the base 110 and the first arm 120 on the basis of the detection result of the mark detecting section 3. Examples of the turning states include a turning angle, turning speed, and a turning direction.

In particular, the determining section 5 includes an image recognition circuit 51 configured to recognize the marks 21 as an image by performing template matching on a captured image (captured image data) of the imaging element using a reference image (reference image data). The determining section 5 determines the relative turning states of the base 110 and the first arm 120 using a result of the recognition by the image recognition circuit 51. The determining section 5 is configured to be capable of more finely determining a relative turning angle of the base 110 and the first arm 120 (hereinafter simply referred to as "turning angle of the first arm 120" as well) on the basis of the position of the image of the marks 21 in the captured image of the imaging element 31. The determining section 5 is also configured to be capable of calculating turning speed on the basis of a time interval at which the marks 21 are detected and determining a turning direction on the basis of the order of kinds of the marks 21 to be detected. The determining section 5 outputs a signal corresponding to a result of the determination, that is, a signal corresponding to the turning states of the base 110 and the first arm 120. The signal is input to, for example, a not-shown control device such as a computer and used for control of the operation of the robot 10. Note that the determining section 5 is desirably configured as hardware using, for example, an ASIC or an FPGA (in terms of processing speed, a reduction in size, and a reduction in cost). Alternatively, the determining section 5 may include a CPU (Central Processing Unit) and a SRAM (Static Random Access Memory). At least a part of the determining section 5 may be incorporated in the control device as hardware or software.

The determining section 5 also has a function of slicing a part of the captured image of the imaging element (a portion including the image of the marks 21) and generating a reference image (a template). The generation of the reference image is performed for each of the marks 21 prior to the determination of the relative turning states of the base 110 and the first arm 120 or as in a timely manner according to necessity. The generated reference image is stored in the storing section 6 in association with the marks 21. The determining section 5 performs the template matching using the reference image (the template) stored in the storing section 6. Note that the template matching and determination of a turning state using the template matching are explained in detail below.

The storing section 6 has stored therein, in association with the marks 21, the reference image (reference image data) together with information (identification information) concerning kinds of the marks 21 corresponding to the reference image, information concerning a coordinate (a coordinate of a reference pixel explained below) in a captured image, and information (angle information) concerning a turning angle of the first arm 120. As the storing section 6, both of a nonvolatile memory and a volatile memory can be used. However, it is desirable to use the nonvolatile memory from the viewpoint that a state of storage of information can be maintained even if electric power is not supplied and power saving can be achieved.

Template Matching and Determination of a Turning State Using the Template Matching The template matching and determination of a turning state using the template matching in the determining section 5 are explained in detail below. Note that, in the following explanation, determination of a turning angle as the turning state is representatively explained. A method of the template matching explained below is an example and is not limited to this.

Acquisition of a Reference Image

The encoder 1 acquires a reference image used for the template matching prior to determining a turning state of the first arm 120 with respect to the base 110 using the template matching. The acquisition of a reference image only has to be performed once before first template matching but, thereafter, may be performed in a timely manner according to necessity. In that case, the reference image used for the template matching can be updated to a reference image acquired anew.

When the reference image is acquired, the first arm 120 is turned as appropriate around the first axis J1 with respect to the base 110. The plurality of marks 21 are imaged by the imaging element 31 for each of the marks 21. A reference image for each of the marks 21 is generated by trimming obtained captured images. The generated reference image is stored in the storing section 6 together with and in association with identification information, pixel coordinate information, and angle information of the reference image. This point is explained in detail below with reference to FIG. 4.

Figure 4:
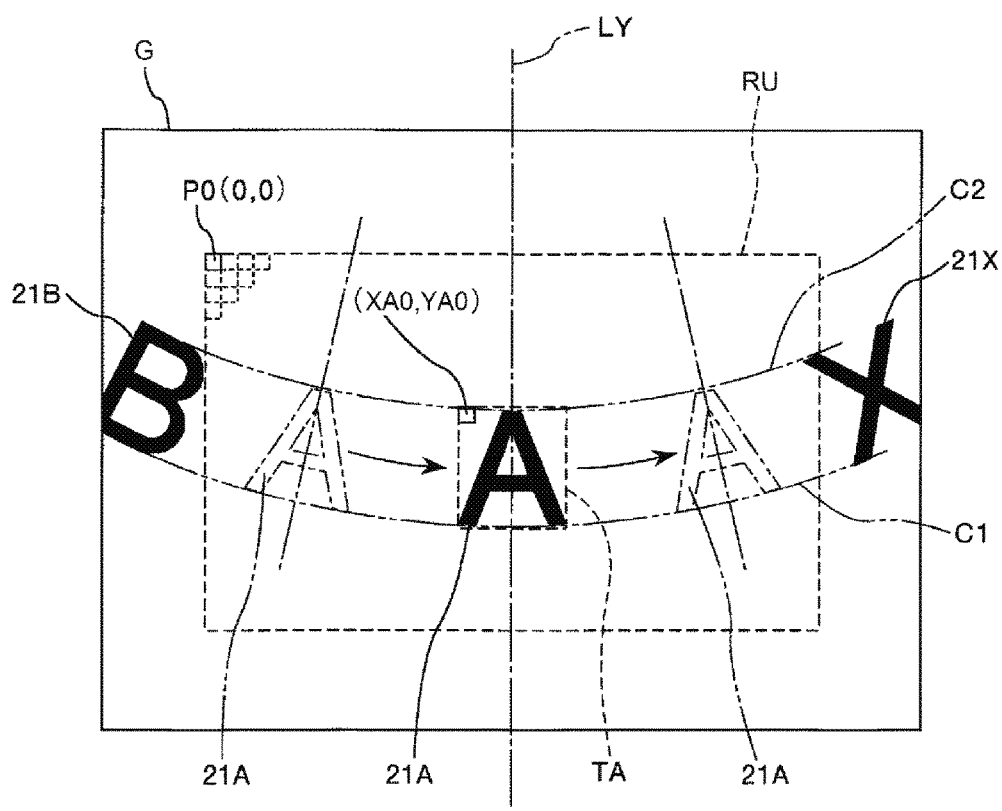
FIG. 4 is a diagram for explaining a captured image of an imaging element included in the encoder shown in FIG. 2.

FIG. 4 is a diagram for explaining a captured image of the imaging element included in the encoder shown in FIG. 2.

When the first arm 120 turns around the first axis J1 with respect to the base 110, for example, as shown in FIG. 4, a mark image 21A, which is an image of the mark 21 indicating a character "A" reflected in a captured image G of the imaging element 31, moves along arcs C1 and C2 in the captured image G. The arc C1 is a track drawn by the lower end in FIG. 4 of the mark image 21A according to the turning of the first arm 120 with respect to the base 110. The arc C2 is a track drawn by the upper end in FIG. 4 of the mark image 21A according to the turning of the first arm 120 with respect to the base 110. In FIG. 4, besides the mark image 21A, a mark image 21B, which is an image of the mark 21 indicating a character "B", and a mark image 21X, which is an image of the mark 21 indicating a character "X", are reflected in the captured image G.

The captured image G obtained by imaging by the imaging element 31 is formed in a shape corresponding to the imaging region RI and a rectangular shape having two sides extending along the X-axis direction and two sides extending along the Y-axis direction. The two sides of the captured image G extending along the X-axis direction are disposed to conform to the arcs C1 and C2 as much as possible. The captured image G includes a plurality of pixels arranged in a matrix shape in the X-axis direction and the Y-axis direction. The position of the pixel is represented by a pixel coordinate system (X, Y) represented by "X" indicating the position of the pixel in the X-axis direction and "Y" indicating the position of the pixel in the Y-axis direction. A center region excluding the outer peripheral part of the captured image G is represented as an effective visual field region RU. A pixel at the upper left end in the figure of the effective visual field region RU is set as an origin pixel (0, 0) of the pixel coordinate system (X, Y).

For example, when a reference image TA for detecting the mark 21 indicating the character "A" is generated, the first arm 120 is turned as appropriate with respect to the base 110. The mark image 21A is located in a predetermined position (in FIG. 4, on a center line LY set in the center in the X-axis direction) in the effective visual field region RU. A turning angle θA0 of the first arm 120 with respect to the base 110 at the time when the mark image 21A is located in the predetermined position is acquired beforehand by measurement or the like.

The reference image TA (a template for detection of the mark 21 indicating the character "A") is obtained by trimming the captured image G in a rectangular pixel range, which is a necessary minimum range including the mark image 21A. The obtained reference image TA is stored in the storing section 6. At this time, the reference image TA is stored together with and in association with identification information concerning a type of the image (in FIG. 4, the character "A"), angle information concerning the turning angle θA0, and pixel coordinate information concerning a reference pixel coordinate (XA0, YA0), which is a pixel coordinate of a reference pixel (in FIG. 4, a pixel at the upper left end) in the pixel range of the reference image TA. That is, the reference image TA and the identification information, the angle information, and the pixel coordinate information corresponding to the reference image TA form one template set used for the template matching.

Determination of a Turning State Using the Template Matching

The template matching using the reference image TA generated as explained above is explained with reference to FIGS. 5 to 8.

Figure 5:
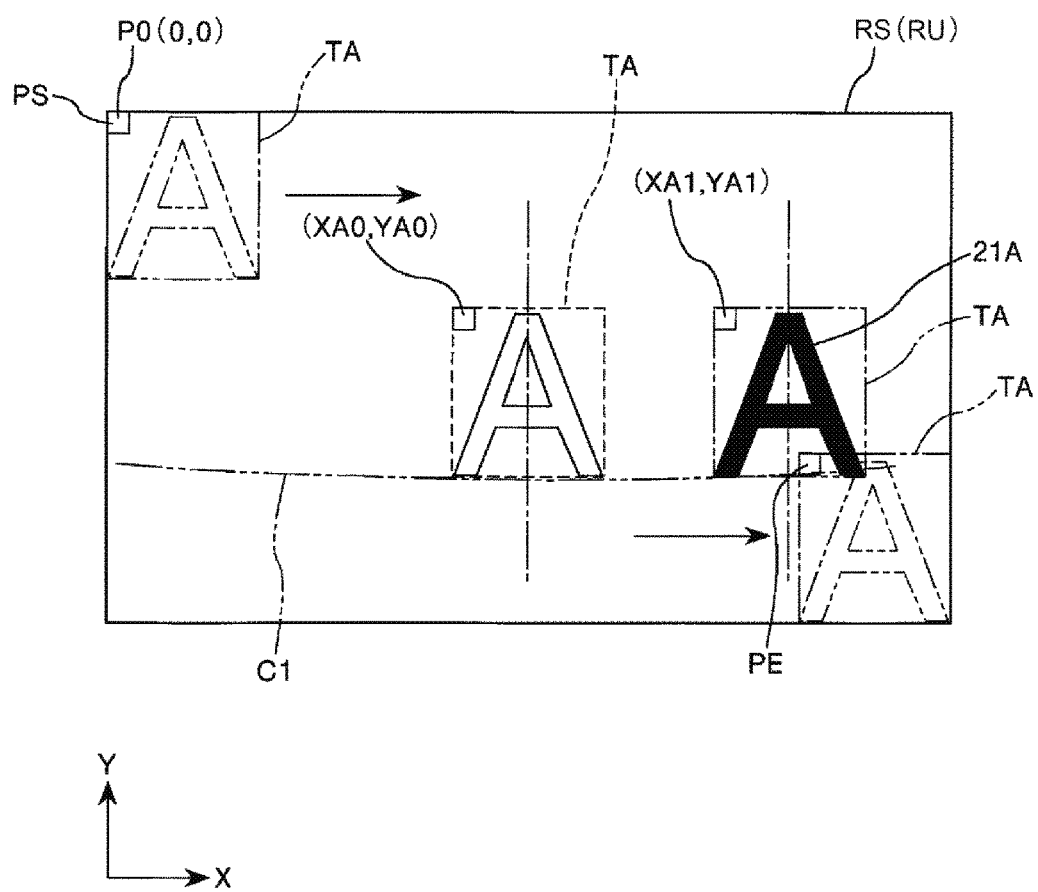
FIG. 5 is a diagram for explaining template matching in a search region set in the captured image shown in FIG. 4.
Figure 6:
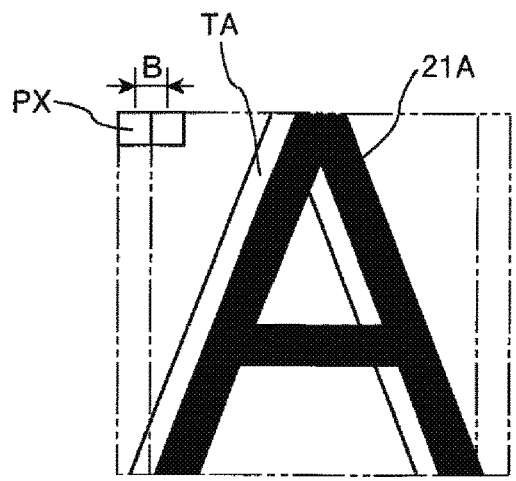
FIG. 6 is a diagram showing a state shifting by one pixel from a state in which a correlation coefficient is a maximum or a minimum in the template matching.
Figure 7:
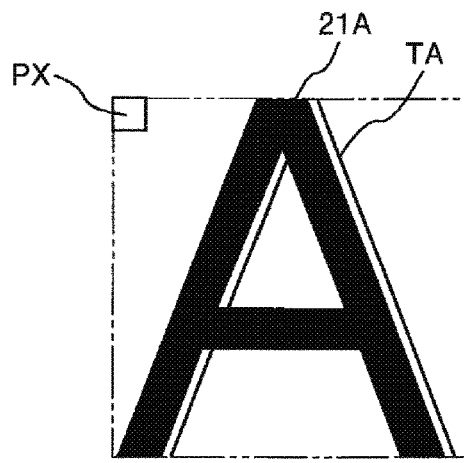
FIG. 7 is a diagram showing the state in which the correlation coefficient is the maximum or the minimum in the template matching.
Figure 8:
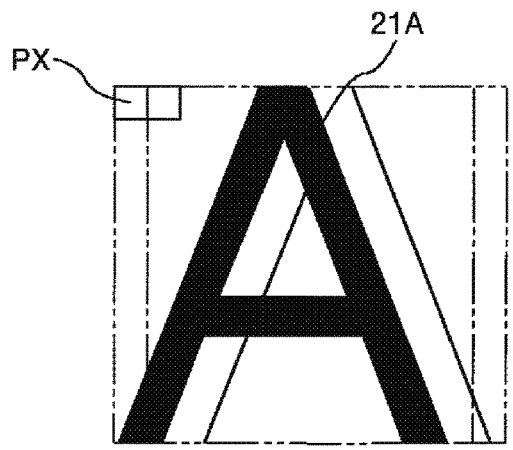
FIG. 8 is a diagram showing a state shifting by one pixel to the opposite side of the state shown in FIG. 6 from the state in which the correlation coefficient is the maximum or the minimum in the template matching.

FIG. 5 is a diagram for explaining the template matching in a search region set in the captured image shown in FIG. 4. FIG. 6 is a diagram showing a state shifting by one pixel from a state in which a correlation coefficient is a maximum or a minimum in the template matching. FIG. 7 is a diagram showing the state in which the correlation coefficient is the maximum or the minimum in the template matching. FIG. 8 is a diagram showing a state shifting by one pixel to the opposite side of the state shown in FIG. 6 from the state in which the correlation coefficient is the maximum or the minimum in the template matching.

As shown in FIG. 5, when the mark image 21A is present in the effective visual field region RU, the template matching is performed on an image in the effective visual field region RU using the reference image TA. In this embodiment, the entire effective visual field region RU is set as a search region RS. The reference image TA is superimposed on the search region RS. A correlation coefficient of an overlapping portion of the search region RS and the reference image TA is calculated while shifting the reference image TA pixel by pixel with respect to the search region RS. In the reference image TA, the pixel coordinate of a reference pixel of the reference image TA is moved pixel by pixel from a start pixel PS (an origin pixel P0) to an end pixel PE. Concerning the pixels in the entire search region RS, the correlation coefficient (correlation coefficient data) of the overlapping portion of the search region RS and the reference image TA is calculated for each of pixel coordinates of the reference pixel of the reference image TA. The correlation coordinate is associated with the pixel coordinates of the reference pixel of the reference image TA and stored in the storing section 6 as correlation coefficient data of the captured image data and the reference image data.

A correlation coefficient having a maximum value among a plurality of correlation coefficients for each of the pixel coordinates stored in the storing section 6 is selected. A pixel coordinate (XA1, YA1) of the reference image TA having the selected correlation coefficient is determined as a pixel coordinate of the mark image 21A. In this way, it is possible to detect the position of the mark image 21A in the captured image G.

It is desirable to calculate a pixel coordinate of the mark image 21A using a sub-pixel estimation method. Near the maximum correlation coordinate, as shown in FIGS. 6 to 8, the reference image TA overlaps the mark 21. In a state shown in FIG. 7, a correlation coefficient is larger in the state shown in FIG. 7 than in the states shown in FIGS. 6 and 8 (the states shifting by one pixel PX from the state shown in FIG. 7) and is the largest. However, when the reference image TA does not completely coincide with and overlaps the mark 21 while shifting from the mark 21 as in the state shown in FIG. 7 and the state shown in FIG. 7 is determined as a pixel position of the mark image 21A, the shift is an error. A maximum of the shift is a visual field size B. That is, when the sub-pixel estimation method is not used, the visual field size B is minimum resolution (accuracy).

On the other hand, when the sub-pixel estimation method is used, it is possible to perform fitting of the correlation coefficient for each visual field size B with a parabola or the like (which may be an isometric straight line) and interpolate (approximate) the correlation coefficients (pixel pitches). Therefore, it is possible to more accurately calculate a pixel coordinate of the mark image 21A. Note that, as a method of calculating a correlation coefficient, a Zero-means Normalized Cross-Correlation (ZNCC), a Sum of Absolute Difference (SAD), a Sum of Squared Difference (SSD), a Phase-Only Correlation (POC), and the like can be used.

In this way, the determining section 5 sets the search region RS in the effective visual field region RU, which is a part of a region of the captured image G, and performs the template matching in the search region RS. Consequently, it is possible to reduce the number of pixels of the search region RS used in the template matching and reduce a calculation time for the template matching. Therefore, even when angular velocity (angular velocity of the marks 21) around the first axis J1 of the first arm 120 is high, it is possible to perform highly accurate detection. Even when distortion or blur of the outer peripheral portion of the captured image G increases because of an aberration of the telecentric optical system 30 disposed between the imaging element 31 and the marks 21, it is possible to reduce deterioration in detection accuracy by using a region with less such distortion or blur as the search region RS. Note that the generation of the reference image TA and the template matching may be performed using the entire region of the captured image G as the search region RS. In this case, it is desirable to perform correction considering the aberration according to necessity.

In this embodiment, since the distance between the imaging region RI and the first axis J1 is sufficiently long, in the captured image G, the arcs C1 and C2 can be respectively nearly approximated to straight lines. Therefore, in the captured image G, a moving direction of the mark image 21A can be considered as coinciding with the X-axis direction.

Then, the mark image 21A is present in a position shifting by the number of pixels (XA1−XA0) in the X-axis direction with respect to the reference image TA present in the reference pixel coordinate (XA0, YA0). Therefore, when a distance R between the center of the imaging region RI and the first axis J1 is represented as r and the width of a region on the imaging region RI corresponding to one pixel of the imaging element 31 (the visual field size B per pixel of the imaging element 31) is represented as W, a turning angle θ of the first arm 120 with respect to the base 110 can be calculated using the following Expression (1).

$$\theta = \theta A0 + (XA1 - XA0) \times W/2r\pi \times 360[°] \quad (1)$$

In Expression (1), (XA1−XA0)×W is equivalent to the distance between an actual position corresponding to the reference pixel coordinate (XA0, YA0) of the reference image TA and an actual position corresponding to the pixel coordinate (XA1, YA1) of the reference image TA in which the correlation coefficient is the maximum. 2rπ is equivalent to the length of the track (the length of the circumference) of the marks 21 at the time when the first arm 120 rotates 360° with respect to the base 110.

When the turning angle θ is calculated in this way, it is also possible to use a so-called sub-pixel estimation method for performing fitting of correlation coefficients of pixels adjacent to the pixel coordinate (XA1, YA1) with a parabola or a parabolic curved surface and determining a coordinate of a maximum correlation coefficient. Consequently, it is possible to calculate a position of the mark image 21A in the captured image G at resolution finer than a pixel unit. As a result, it is possible to improve detection accuracy of the turning angle θ.

The template matching and the calculation of the turning angle θ using the template matching explained above are performed in the same manner concerning the other marks 21 (other than the mark 21 indicating the character "A"). At any turning angle θ, at least one mark 21 is reflected in the effective visual field region RU without missing and reference images corresponding to the marks 21 are registered to enable the template matching. Consequently, it is possible to prevent occurrence of an angle range in which the template matching is impossible.

In FIG. 4 referred to above, the marks 21 and the effective visual field region RU are configured such that one mark 21 is reflected in the effective visual field region RU without missing. However, it is desirable that the marks 21 and the effective visual field region RU are configured such that the plurality of marks 21 are reflected in the effective visual field region RU without missing at any turning angle θ. In this case, the template matching is performed using two or more reference images corresponding to two or more marks 21 adjacent to one another such that the template matching can be performed on the plurality of marks 21 reflected in the effective visual field region RU at any turning angle θ. At this time, the two or more reference images may partially overlap one another.

That is, since the plurality of marks 21 are disposed in the first arm 120, it is desirable that the imaging element 31 images the entire two marks 21 adjacent to each other in the circumferential direction around the first axis J1 (a turning axis). Consequently, even if one mark 21 of the two marks 21 imaged by the imaging element 31 cannot be accurately read because of stain or the like, it is possible to read the other mark 21 and perform detection. Therefore, there is an advantage that it is easy to guarantee high detection accuracy.

Telecentric Optical System

The telecentric optical system 30 and components related to the telecentric optical system 30 are explained in detail below.

Figure 9:
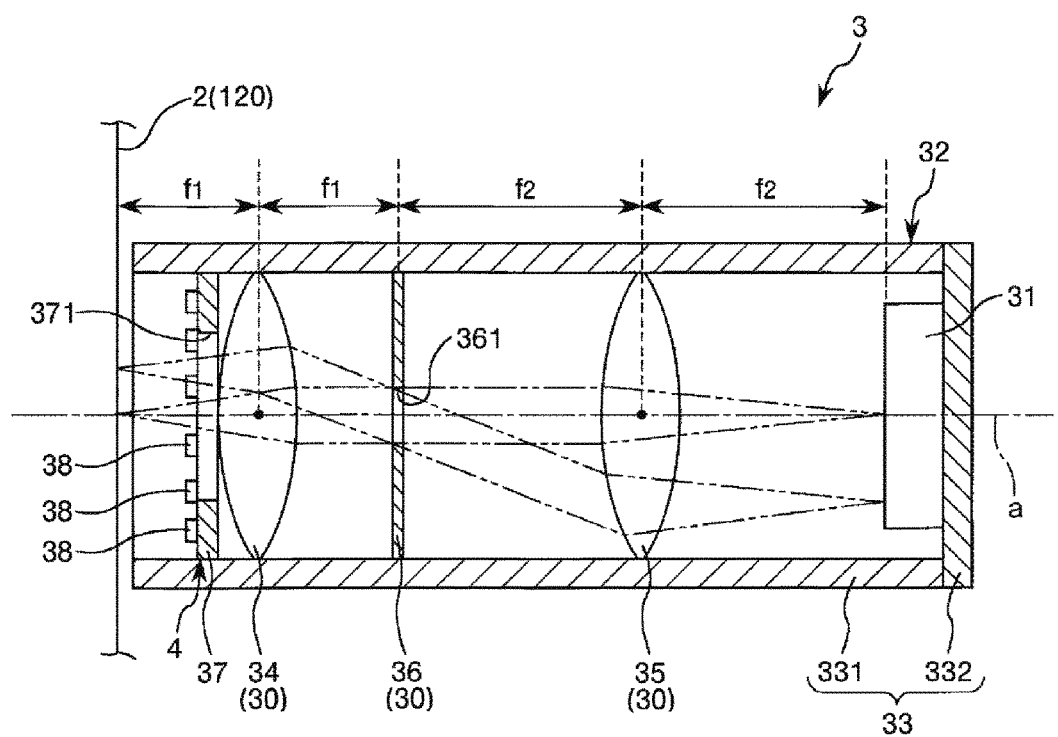
FIG. 9 is a sectional view taken along an optical axis of a telecentric optical system (an image forming optical system) included in the encoder shown in FIG. 2.

FIG. 9 is a sectional view taken along an optical axis of the telecentric optical system (the imaging optical system) included in the encoder shown in FIG. 2.

As shown in FIG. 9, the optical unit 32 includes a casing 33 formed in a bottomed tubular shape opened at one end and the telecentric optical system 30 and an illumination unit 4 housed in the casing 33. The telecentric optical system 30 includes lenses 34 and 35 and a stop 36.

The casing 33 includes a tubular member 331 (a lens barrel) formed in a tubular shape and a bottom member 332 that closes one end opening of the tubular member 331. A constituent material of the tubular member 331 and the bottom member 332 is not particularly limited. Examples of the constituent material include a metal material and a resin material. Treatment for preventing reflection of light, for example, treatment such as black coating is applied to the inner circumferential surface of the tubular member 331 and the inner surface of the bottom member 332.

The imaging element 31 is disposed on the inner surface (a surface exposed in the tubular member 331) of the bottom member 332 of the casing 33. In the tubular member 331, the lens 35, the stop 36, the lens 34, and the illumination unit 4 are disposed in this order from the bottom member 332 side (the imaging element 31 side) toward the opening side (the mark section 2 side). These components are fixed to the inner circumferential surface of the tubular member 331 by, for example, bonding.

The lens 34 is set such that the distance between the centers of the lens 34 and the stop 36 and the distance between the center of the lens 34 and the mark section 2 are respectively equal to a focal length f1 of the lens 34. The lens 35 is set such that the distance between the centers of the lens 35 and the stop 36 and the distance between the center of the lens 35 and an imaging surface of the imaging element 31 are respectively equal to a focal length f2 of the lens 35. The stop 36 includes an opening 361 on an optical axis "a". When the image forming magnification of the telecentric optical system 30 is represented as N, a relation N=f2/f1 is satisfied.

Note that the distance between the center of the lens 34 and the mark section 2 may deviate within a range of the focal depth of the lens 34. The distance between the center of the lens 35 and the imaging surface of the imaging element 31 may deviate within a range of the focal depth of the lens 35.

In such a telecentric optical system 30, a main beam (a beam passing the center of the stop 36) is parallel to the optical axis "a" between the mark section 2 and the lens 34. Therefore, even if the distance between the mark section 2 and the lens 34 changes, the image forming magnification on the imaging element 31 does not change. In other words, even if the distance between the mark section 2 and the lens 34 changes, an image forming position on the imaging element 31 does not change.

The illumination unit 4 includes a substrate 37 and a plurality of light source sections 38 provided on a surface of the substrate 37 on the opposite side of the lens 34.

The substrate 37 is, for example, a wiring board. The substrate 37 supports the plurality of light source sections 38 and is electrically connected to the plurality of light source sections 38. In this embodiment, the substrate 37 includes an opening 371 and is formed in an annular shape around the optical axis "a". The substrate 37 has a light blocking property and has a function of preventing lights emitted from the light source sections 38 from being made incident on the lens 34 side.

The plurality of light source sections 38 are disposed side by side on the same circumference centering on the optical axis "a" along the circumferential direction of the substrate 37. The light source sections 38 are, for example, light emitting diodes. Lights emitted from the light source sections 38 desirably have a single wavelength and more desirably have a small wavelength from the viewpoint of reducing deterioration in detection accuracy due to color aberration in the lenses 34 and 35. Since sensitivity in the imaging element 31 is satisfactory, the lights emitted from the light source sections 38 are desirably, for example, blue lights. A light emitting diode that emits blue light is relatively inexpensive. Note that the number, the disposition, and the like of the light source sections 38 are not limited to those shown in FIG. 9. The light source sections 38 desirably illuminate the mark section 2 as uniformly as possible from the viewpoint of performing clear imaging in the imaging element 31. Optical components that diffuse lights may be provided on the light source sections 38 according to necessity.

Figure 10:
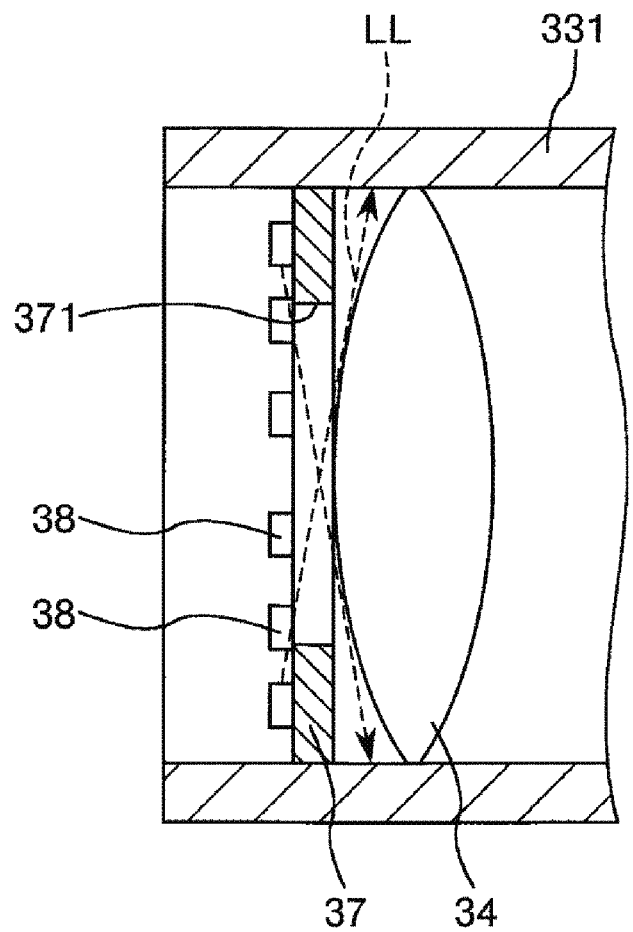
FIG. 10 is a partially enlarged sectional view for explaining light source sections provided in the telecentric optical system shown in FIG. 9.
Figure 11:
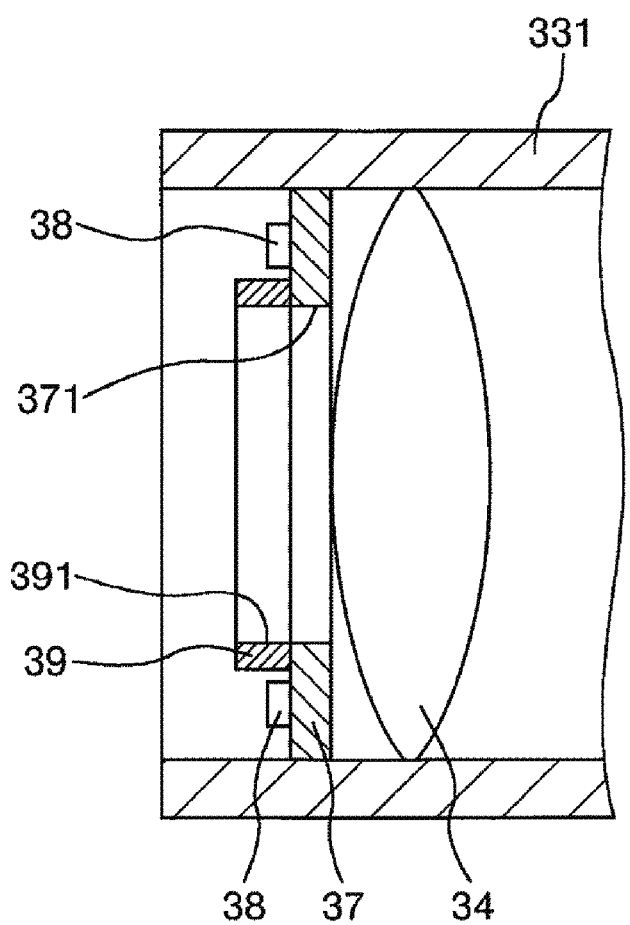
FIG. 11 is a partially enlarged sectional view for explaining a modification of the telecentric optical system shown in FIG. 9.

FIG. 10 is a partially enlarged sectional view for explaining the light source sections provided in the telecentric optical system shown in FIG. 9. FIG. 11 is a partially enlarged sectional view for explaining a modification of the telecentric optical system shown in FIG. 9.

The illumination unit 4 configures an oblique illumination that illuminates the mark section 2 from a direction inclining with respect to the optical axis "a".

As shown in FIG. 10, when light LL emitted from the light source section 38 is made incident on the lens 34 side via the opening 371 of the substrate 37, imaging quality of the imaging element 31 is sometimes deteriorated. Therefore, in the illumination unit 4, it is desirable to set the shape of the opening 371 of the substrate 37 and the disposition, the direction, and the like of the plurality of light source sections 38 such that the light LL emitted from the light source section 38 is not made incident on the lens 34 side via the opening 371 of the substrate 37 as much as possible.

As shown in FIG. 11, a light blocking member 39 configured to prevent the light LL emitted from the light source section 38 from being made incident on the lens 34 side via the opening 371 of the substrate 37 may be provided on the substrate 37. The light blocking member 39 is formed in a tubular shape including a through-hole 391 corresponding to the opening 371 of the substrate 37. The light blocking member 39 projects from a surface of the substrate 37 on the light source section 38 side. A constituent material of the light blocking member 39 is not particularly limited. Examples of the constituent material of the light blocking member 39 include a resin material and a metal material. Treatment for preventing reflection of light is desirably applied to the inner circumferential surface of the light blocking member 39 like the inner circumferential surface of the casing 33. Treatment for preventing reflection of light may be applied to the outer circumferential surface of the light blocking member 39 like the inner circumferential surface of the casing 33. Alternatively, the outer circumferential surface of the light blocking member 39 may have light reflectivity. When the outer circumferential surface of the light blocking member 39 has light reflectivity, the outer circumferential surface of the light blocking member 39 desirably has a function of scattering light. Consequently, light emitted from the light source section 38 can be used without waste. The mark section 2 can be uniformly illuminated.

Figure 12:
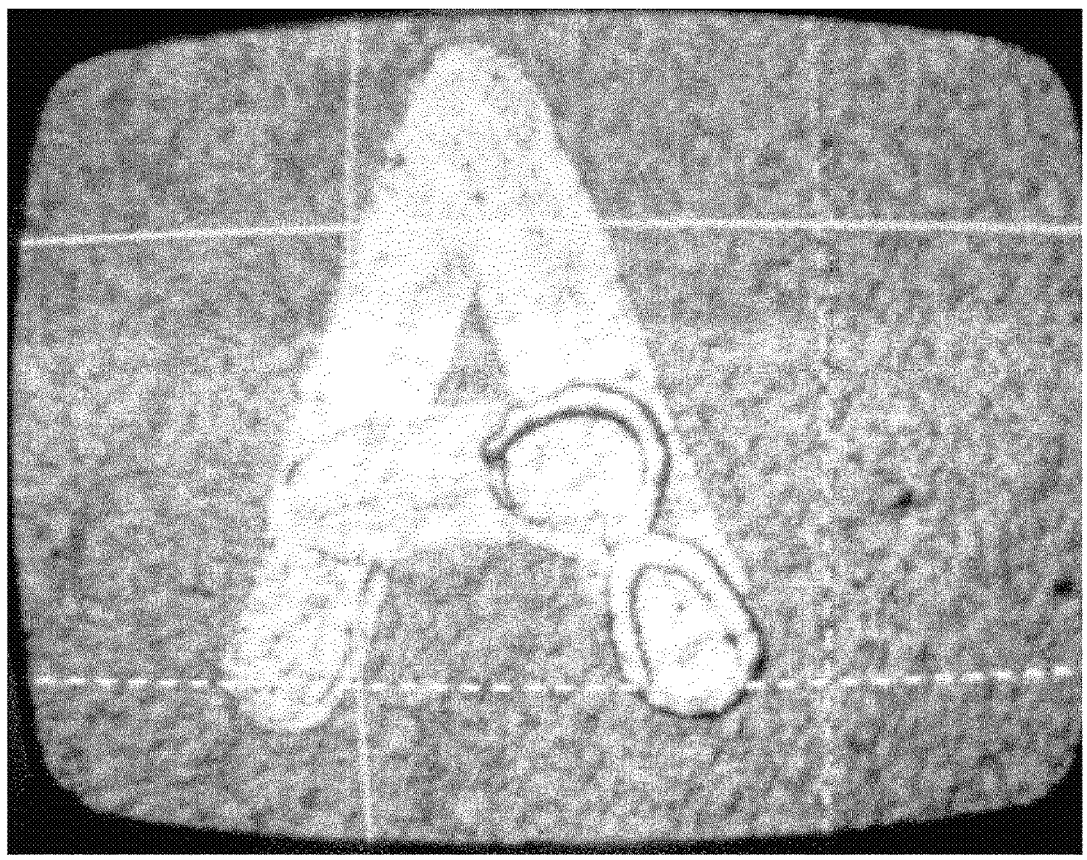
FIG. 12 is a captured image obtained by capturing, with a telecentric camera of a coaxial epi-illumination, a mark formed of pigment paint (a black marker in a white paint background).
Figure 13:
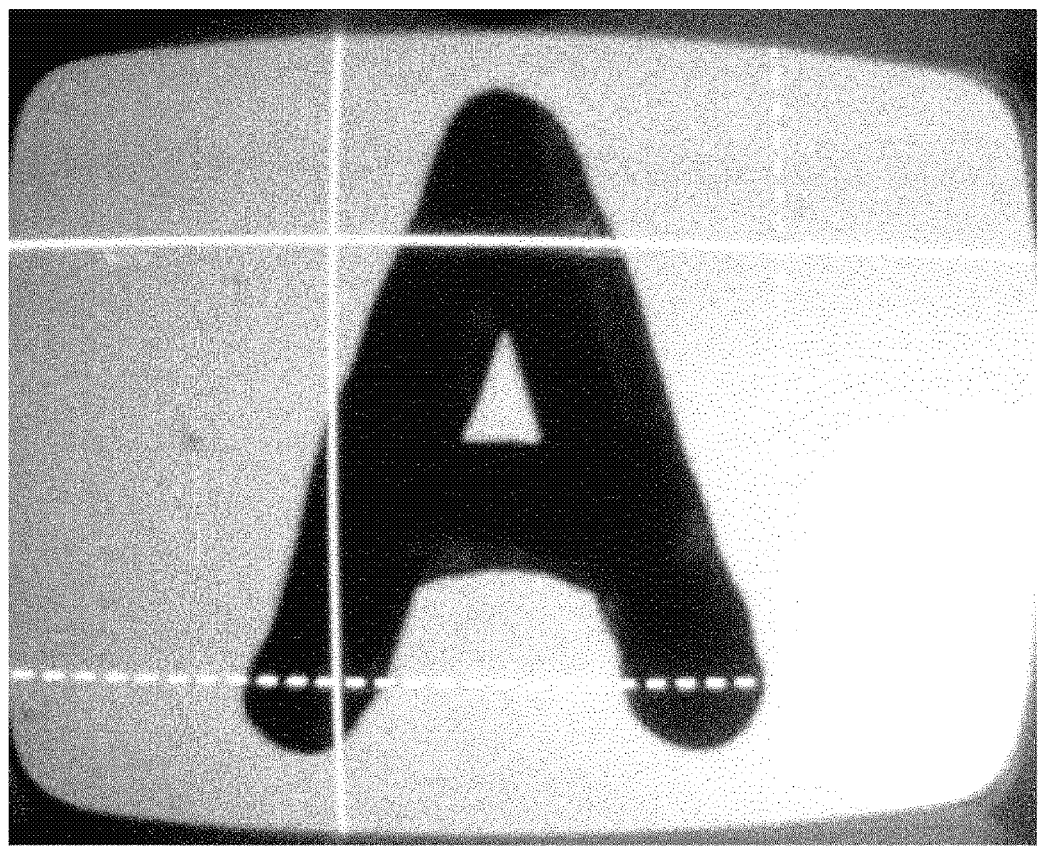
FIG. 13 is a captured image obtained by capturing, with a telecentric camera of an oblique illumination, the mark formed of the pigment paint (the black marker in the white paint background).

FIG. 12 is a captured image obtained by imaging, with a telecentric camera of a coaxial epi-illumination, a mark formed of pigment paint (a black marker in a white paint background). FIG. 13 is a captured image obtained by capturing, with a telecentric camera of an oblique illumination, the mark formed of the pigment paint (the black marker in the white paint background). The "telecentric camera" refers to a device including a telecentric optical system and an imaging element and configured to perform imaging with the imaging element via the telecentric optical system.

When the mark 21 (in this example, the character "A") is formed of the pigment paint (the black marker in the white paint background), the contrast of the captured image is high when the mark 21 is imaged by the telecentric camera of the oblique illumination (see FIG. 13) compared with the case where the mark 21 is imaged by the telecentric camera of the coaxial epi-illumination (see FIG. 12).

Figure 14:
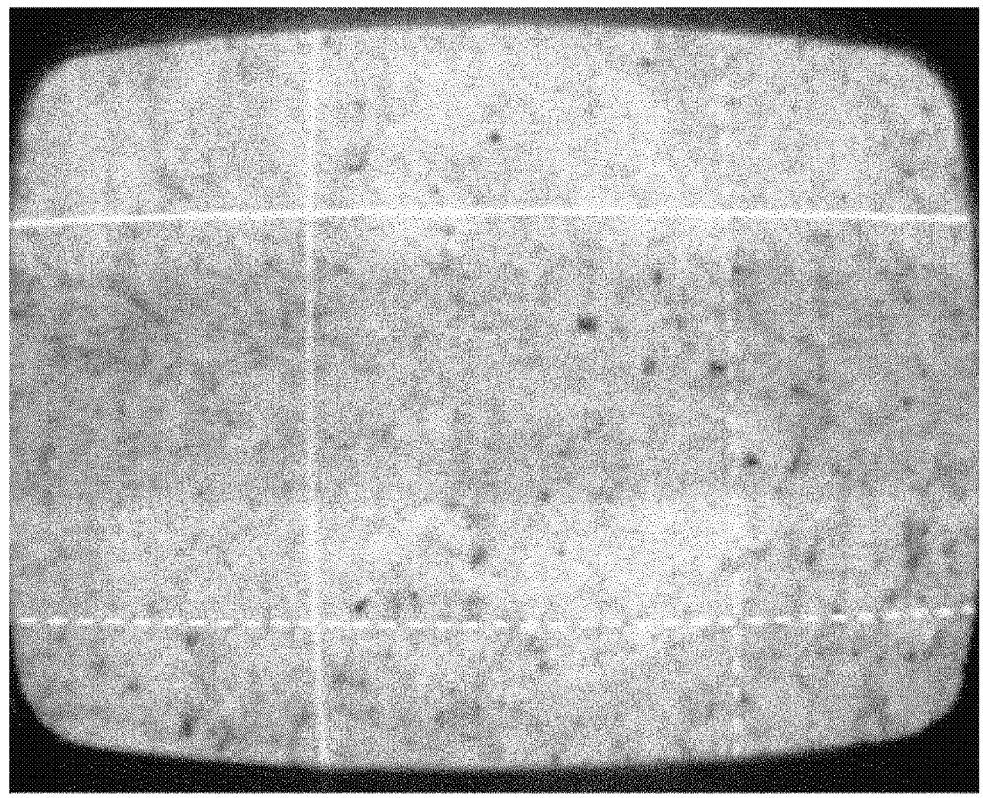
FIG. 14 is a captured image obtained by capturing, with the telecentric camera of the coaxial epi-illumination, the mark formed of the pigment paint (the black marker in the white paint background) in a state in which the mark is coated with clear painting.
Figure 15:
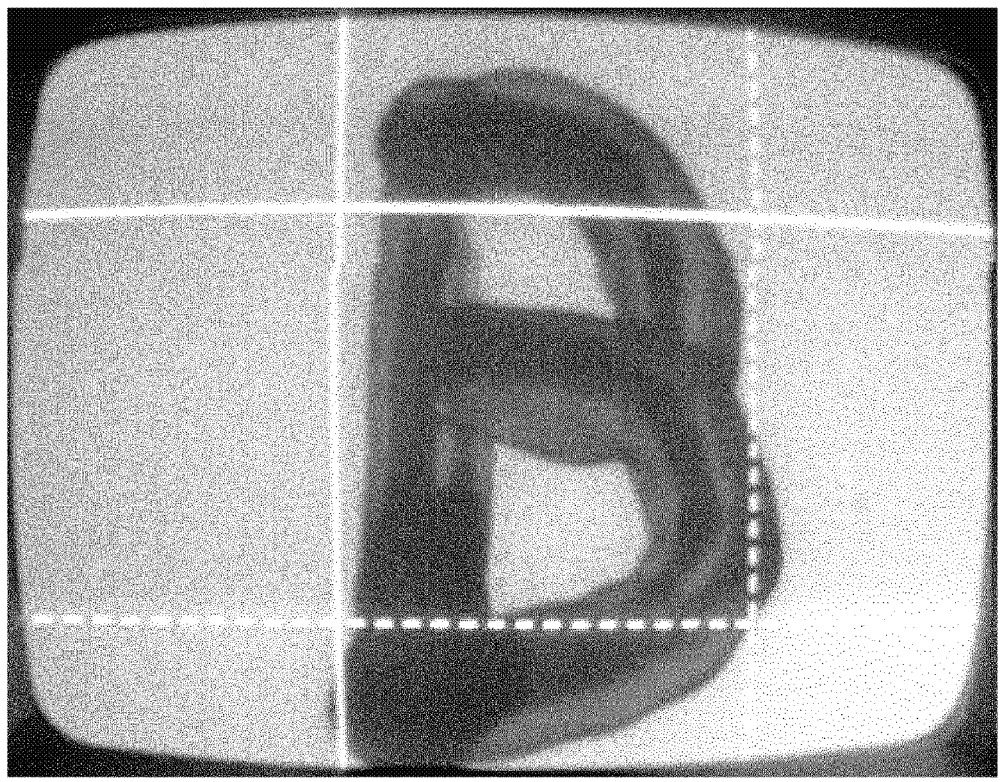
FIG. 15 is a captured image obtained by capturing, with the telecentric camera of the oblique illumination, the mark formed of the pigment paint (the black marker in the white paint background) in the state in which the mark is coated with the clear painting.

FIG. 14 is a captured image obtained by capturing, with the telecentric camera of the coaxial epi-illumination, the mark formed of the pigment paint (the black marker in the white paint background) in a state in which the mark is coated with clear painting. FIG. 15 is a captured image obtained by capturing, with the telecentric camera of the oblique illumination, the mark formed of the pigment paint (the black marker in the white paint background) in the state in which the mark is coated with the clear painting.

When the mark 21 (in this example, the character "B") formed of the pigment paint (the black marker in the white paint background) is coated with the clear painting, the contrast of the captured image is extremely low when the mark 21 is imaged by the telecentric camera of the coaxial epi-illumination (see FIG. 14). On the other hand, satisfactory contrast of the captured image is obtained when the mark 21 is imaged by the telecentric camera of the oblique illumination (see FIG. 15).

In this way, when the mark formed using the paint is observed, in the imaging by the telecentric camera, the captured image with more satisfactory contrast can be obtained when the oblique illumination is used than when the coaxial epi-illumination is used.

When the coaxial epi-illumination is applied to the telecentric optical system 30, a light source has to be set on the outside of the casing 33. This causes an increase in the size of the entire telecentric optical system 30 including the illumination. In this case, a half mirror has to be set on the optical axis "a". A light source having a larger light amount is necessary in order to secure an image forming light amount.

On the other hand, the oblique illumination can be disposed in the casing 33 like the illumination unit 4. The problem of the increase in size, which occurs when the coaxial epi-illumination is used, does not occur. Since it is unnecessary to set the half mirror on the optical axis "a", from the viewpoint of an image forming light amount, the use of the oblique illumination is advantageous compared with the use of the coaxial epi-illumination.

When the telecentric camera and the oblique illumination are used in combination as in this embodiment, the marks 21 need to scatter light. From such a viewpoint, the marks 21, which are bright portions of the mark section 2 in the captured image, are desirably formed using a pigment such as pigment paint or pigment ink or formed by micro unevenness treatment. On the other hand, a dark portion (a portion other than the marks 21) of the mark section 2 in the captured image is desirably formed using, for example, paint or ink (which may be either pigment or dye) of a complementary color of the light emitted from the light source section 38 or black to absorb the light or may be formed as a mirror surface. The mark section 2 may be covered with a light transmissive film such as the clear painting.

As explained above, the robot 10 includes the base 110, the robot arm 100 provided to be turnable around the first axis J1 (the turning axis) with respect to the base 110, and the encoder 1 configured to detect a turning state of the robot arm 100. The encoder 1 includes the marks 21 configured to turn around the first axis J1 according to the turning of the robot arm 100 and the imaging element 31 configured to image the marks 21. The encoder 1 detects the turning state of the robot arm 100 using a signal output from the imaging element 31. In particular, the encoder 1 includes the telecentric optical system 30 disposed between the imaging element 31 and the marks 21.

With such a robot 10, since the telecentric optical system 30 (the image forming optical system) is disposed between the imaging element 31 and the marks 21, even if the distance between the marks 21 and the imaging element 31 fluctuates, it is possible to reduce a change in the image forming magnification on the imaging element 31. As a result, it is possible to reduce deterioration in the detection accuracy of the encoder 1.

In this embodiment, the telecentric optical system 30 is the bi- (the object side and the image side) telecentric. Consequently, even if the distance between the lens 35 included in the telecentric optical system 30 and the imaging element 31 fluctuates, it is possible to reduce a change in the image forming magnification on the imaging element 31. Therefore, there is an advantage that it is easy to assemble the telecentric optical system 30.

The encoder 1 includes the light source sections 38 configured to irradiate lights on the marks 21 from the directions inclined with respect to the optical axis "a" of the telecentric optical system 30. Consequently, it is possible to improve the contrast of the captured image of the imaging element 31 compared with the case where the coaxial epi-illumination is used. There is also an advantage that the telecentric optical system 30 is small compared with the case where the coaxial epi-illumination is used.

Further, the light source sections 38 are disposed in the ring shape around the optical axis "a". Consequently, it is possible to uniformly illuminate the marks 21. As a result, it is possible to improve the quality of the captured image of the imaging element 31.

The marks 21 are desirably formed using pigment or formed using unevenness. When the marks 21 are formed using the pigment, it is possible to easily form the marks 21. In general, the pigment contains particles that scatter light. Therefore, since the oblique illumination is used, it is possible to improve the contrast of the captured image of the imaging element 31. Since the marks 21 are formed using the unevenness, for example, the marks 21 do not peel off like a coating film. The marks 21 are less easily damaged compared with the case where the marks 21 are formed of the coating film. Therefore, it is possible to improve durability of the marks 21. When the oblique illumination is used, by scattering light with the unevenness, it is possible to improve the contrast of the captured image of the imaging element 31.

The encoder 1 desirably includes light transmissive coating that covers the marks 21. Consequently, it is possible to protect the marks 21. When the coaxial epi-illumination is used, it is difficult to obtain a captured image having satisfactory contrast. However, when the oblique illumination is used, it is possible to obtain a captured image having satisfactory contrast.

In this embodiment, the marks 21 are present on the surface of the robot arm 100 (more specifically, the first arm 120). Consequently, it is unnecessary to separately provide a member for setting the marks 21. It is possible to reduce the number of components and achieve a reduction in cost.

The encoder 1 configured to detect a turning state of the second arm 130 with respect to the first arm 120 has the same configuration as the encoder 1 configured to detect a turning state of the first arm 120 with respect to the base 110 and achieves the same effect.

That is, the robot 10 includes the robot arm 100 including the first arm 120 and the second arm 130 provided to be turnable around the second axis J2 (the turning axis) with respect to the first arm 120 and the encoder 1 configured to detect a turning state of the second arm 130 with respect to the first arm 120. The encoder 1 includes the marks 21 configured to turn around the second axis J2 according to the turning of the second arm 130 and the imaging element 31 configured to image the marks 21. The encoder 1 detects a turning state of the second arm 130 with respect to the first arm 120 using a signal output from the imaging element 31. In particular, the encoder 1 includes the telecentric optical system 30 disposed between the imaging element 31 and the marks 21. Consequently, it is possible to reduce deterioration in detection accuracy of the encoder 1 configured to detect a turning state of the second arm 130 with respect to the first arm 120.

In the encoder 1 configured to detect a turning state of the second arm 130 with respect to the first arm 120, the marks 21 are desirably present on the surface of the first arm 120 or the second arm 130. Consequently, it is unnecessary to separately provide a member for setting the marks 21. It is possible to reduce the number of components and achieve a reduction in cost.

Second Embodiment

Figure 16:
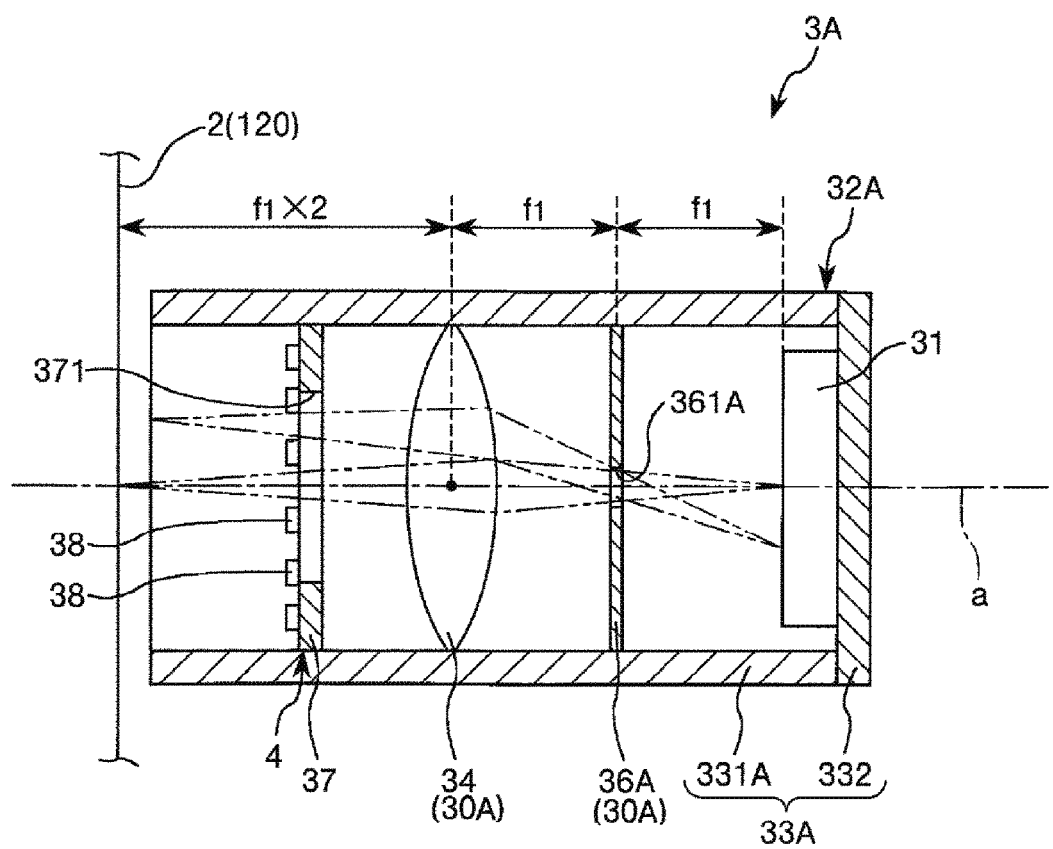
FIG. 16 is a sectional view taken along an optical axis of a telecentric optical system (an image forming optical system) included in an encoder according to a second embodiment of the invention.

FIG. 16 is a sectional view taken along an optical axis of a telecentric optical system (an image forming optical system) included in an encoder according to a second embodiment of the invention.

The second embodiment is explained below. Differences from the first embodiment are mainly explained. Explanation of similarities to the first embodiment is omitted.

This embodiment is the same as the first embodiment except that the configuration of the telecentric optical system is different.

An optical unit 32A included in a sensor unit 3A according to this embodiment includes, as shown in FIG. 16, a casing 33A formed in a bottomed tubular shape opened at one end and a telecentric optical system 30A and the illumination unit 4 housed in the casing 33A. The telecentric optical system 30A includes the lens 34 and a stop 36A. The telecentric optical system 30A is object-side telecentric.

The casing 33A includes a tubular member 331A (a lens barrel) formed in a tubular shape and the bottom member 332 that closes one end opening of the tubular member 331A.

In the tubular member 331A of the casing 33A, the stop 36A, the lens 34, and the illumination unit 4 are disposed in this order from the bottom member 332 side (the imaging element 31 side) toward the opening side (the mark section 2 side). These components are fixed to the inner circumferential surface of the tubular member 331A by, for example, bonding.

The stop 36A includes an opening 261A on the optical axis "a". The stop 36A is set such that the distance between the center of the stop 36A and the imaging surface of the imaging element 31 is equal to the focal length f1 of the lens 34. The lens 34 is set such that the distance between the centers of the lens 34 and the stop 36A is equal to the focal length f1 and the distance between the center of the lens 34 and the mark section 2 is equal to a double of the focal length f1 of the lens 34.

Note that the distance between the center of the lens 34 and the mark section 2 does not have to be completely equal to the double of the focal length f1 of the lens 34 and may deviate within the range of the focal depth of the lens 34.

In such a telecentric optical system 30A, as in the telecentric optical system 30, even if the distance between the mark section 2 and the lens 34 changes, the image forming magnification on the imaging element 31 does not change.

In this way, the telecentric optical system 30A is object-side telecentric. Consequently, it is possible to use a small number of lenses (e.g., one lens) in the telecentric optical system 30A. As a result, it is possible to achieve a reduction in the cost of the telecentric optical system 30A and a reduction in the cost of the encoder.

According to the second embodiment explained above, as in the first embodiment, it is possible to reduce deterioration in the detection accuracy of the encoder.

Third Embodiment

Figure 17:
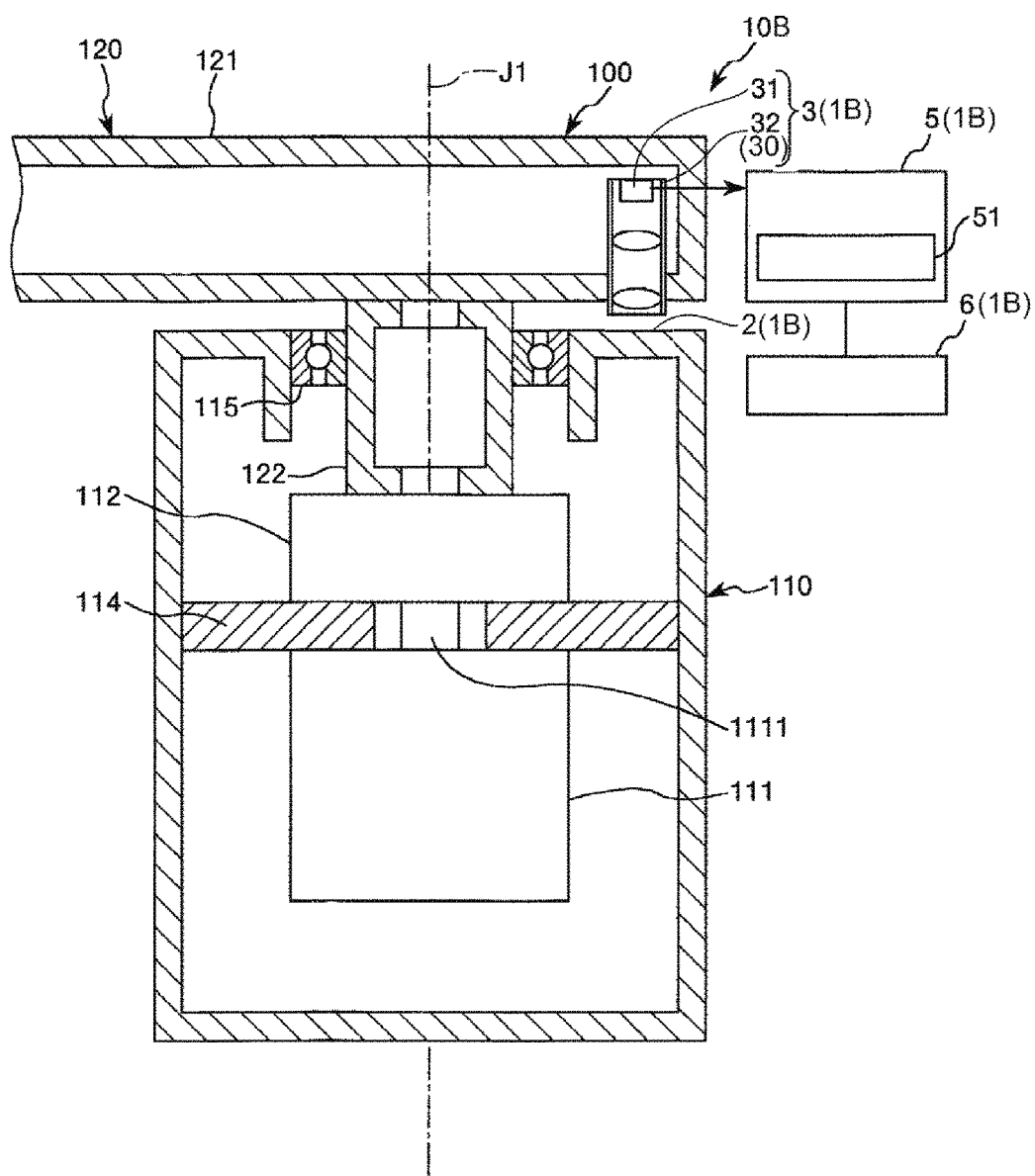
FIG. 17 is a sectional view for explaining an encoder included in a robot according to a third embodiment of the invention.

FIG. 17 is a sectional view for explaining an encoder included in a robot according to a third embodiment of the invention.

The third embodiment is explained below. Differences from the embodiments explained above are mainly explained. Explanation of similarities to the embodiments is omitted.

This embodiment is the same as the first embodiment except that the disposition of marks, an imaging element, and a telecentric lens are different.

A robot 10B shown in FIG. 17 includes an encoder 1B configured to detect a turning state of the first arm 120 with respect to the base 110.

Basic components of the encoder 1B are the same as the basic components of the encoder 1 in the first embodiment. However, the disposition of the mark section 2 and the mark detecting section 3 is opposite to the disposition in the encoder 1 in the first embodiment. That is, the encoder 1B includes the mark section 2 provided on the base 110, the mark detecting section 3 provided in the first arm 120 and configured to detect the mark section 2, the determining section 5 configured to determine relative turning states of the base 110 and the first arm 120 on the basis of a result of the detection by the mark detecting section 3, and the storing section 6 electrically connected to the determining section 5.

In this way, in this embodiment, the marks 21 are present on the surface of the base 110. Consequently, it is unnecessary to separately provide a member for setting the marks 21. It is possible to reduce the number of components and achieve a reduction in cost.

According to the third embodiment explained above, as in the embodiments explained above, it is possible to reduce deterioration in detection accuracy of the encoder 1B.

Fourth Embodiment

Figure 18:
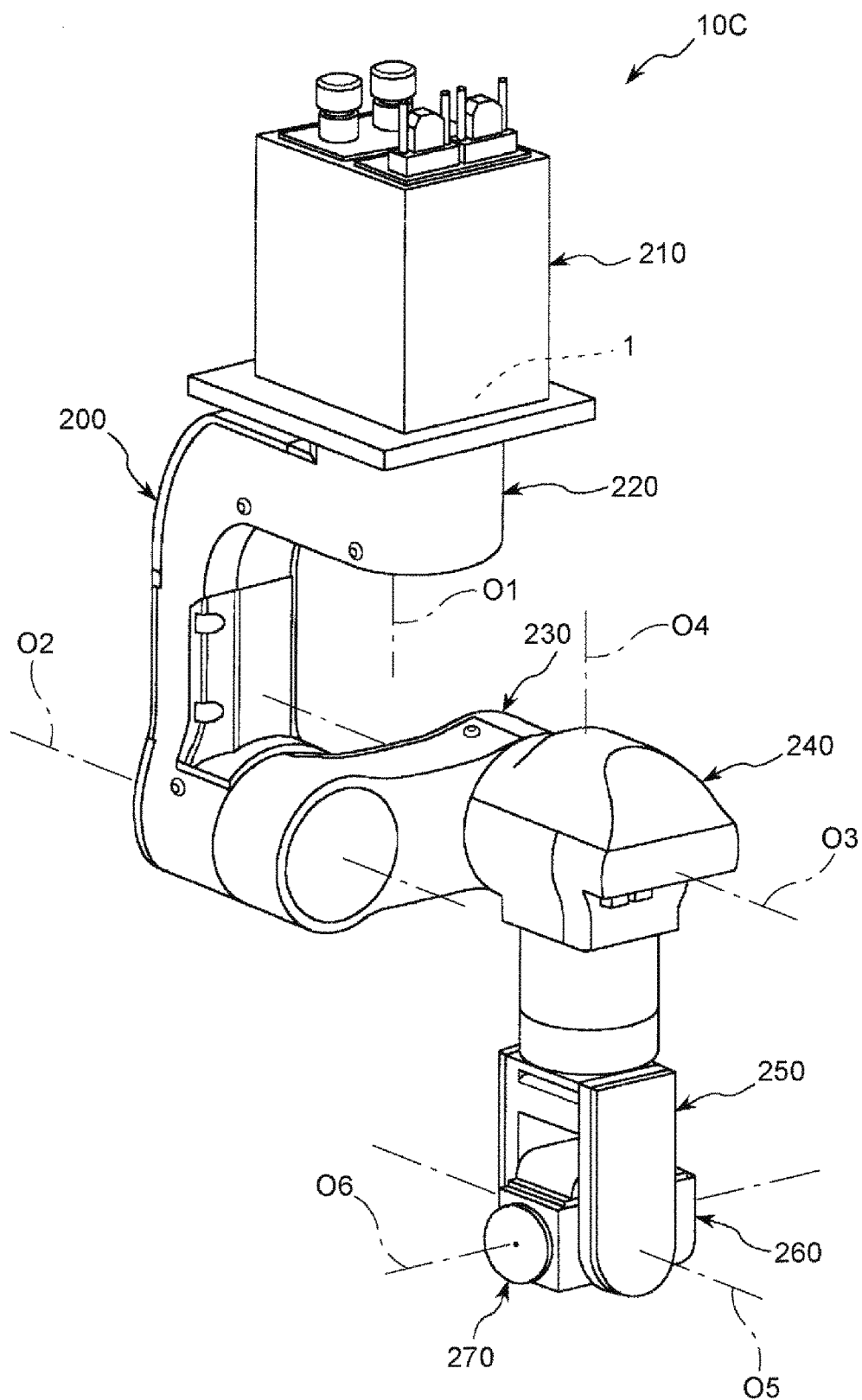
FIG. 18 is a perspective view showing a robot according to a fourth embodiment of the invention.

FIG. 18 is a perspective view showing a robot according to a fourth embodiment of the invention. Note that, in the following explanation, a base 210 side of a robot 10C is referred to as "proximal end side" and an end effector side of the robot 10C is referred to as "distal end side".

The fourth embodiment is explained below. Differences from the embodiments explained above are mainly explained. Explanation of similarities to the embodiments is omitted.

A robot 10C shown in FIG. 18 is a vertical articulated (six-axis) robot. The robot 10C includes a base 210 and a robot arm 200. The robot arm 200 includes a first arm 220, a second arm 230, a third arm 240, a fourth arm 250, a fifth arm 260, and a sixth arm 270. These arms are coupled in this order from the proximal end side toward the distal end side. Although not shown in FIG. 18, an end effector such as a hand that grips, for example, precision instruments, components, and the like is detachably attached to the distal end portion of the sixth arm 270. Although not shown in FIG. 18, the robot 10C includes a robot control device (a control section) such as a personal computer (PC) that controls the operations of the sections of the robot 10C.

The base 210 is fixed to, for example, a floor, a wall, or a ceiling. The first arm 220 is turnable around a first turning axis O1 with respect to the base 210. The second arm 230 is turnable around a second turning axis O2, which is orthogonal to the first turning axis O1, with respect to the first arm 220. The third arm 240 is turnable around a third turning axis O3, which is parallel to the second turning axis O2, with respect to the second arm 230. The fourth arm 250 is turnable around a fourth turning axis O4, which is orthogonal to the third turning axis O3, with respect to the third arm 240. The fifth arm 260 is turnable around a fifth turning axis O5, which is orthogonal to the fourth turning axis O4, with respect to the fourth arm 250. The sixth arm 270 is turnable around a sixth turning axis O6, which is orthogonal to the fifth turning axis O5, with respect to the fifth arm 260. Note that, concerning the first turning axis O1 to the sixth turning axis O6, "orthogonal" includes deviation of an angle formed by two axes from 90° within a range of ±5° and "parallel" includes inclination of one of the two axes with respect to the other within a range of ±5°.

Although not shown in FIG. 18, driving sources including motors and reduction gears are provided in coupling sections (joints) of the base 210 and the first arm 220 to the sixth arm 270. The encoder 1 is provided in the driving source that turns the first arm 220 with respect to the base 210. A detection result of the encoder 1 is input to, for example, a not-shown robot control device and used for driving control of the driving source that turns the first arm 220 with respect to the base 210. Although not shown in FIG. 18, encoders are also provided in the other joint sections. The encoder 1 can be used as the encoders.

As explained above, the robot 10C includes the base 210, the robot arm 200 provided to be turnable around the first turning axis O1 (the turning axis) with respect to the base 210, and the encoder 1 configured to detect a turning state of the robot arm 200. The encoder 1 includes the marks 21 configured to turn around the first turning axis O1 according to the turning of the robot arm 100 and the imaging element 31 configured to image the marks 21. The encoder 1 detects a turning state of the robot arm 200 using a signal output from the imaging element 31. In particular, the encoder 1 includes the telecentric optical system 30 disposed between the imaging element 31 and the marks 21.

In the above explanation, the encoder 1 detects a turning state of the first arm 220 with respect to the base 210. However, the encoder 1 can also be set in the other joint sections to detect turning states of the other arms. In this case, one of two arms, turning states of which are detected by the encoder 1, only has to be grasped as a "first arm" and the other only has to be grasped as a "second arm".

Printer

Figure 19:
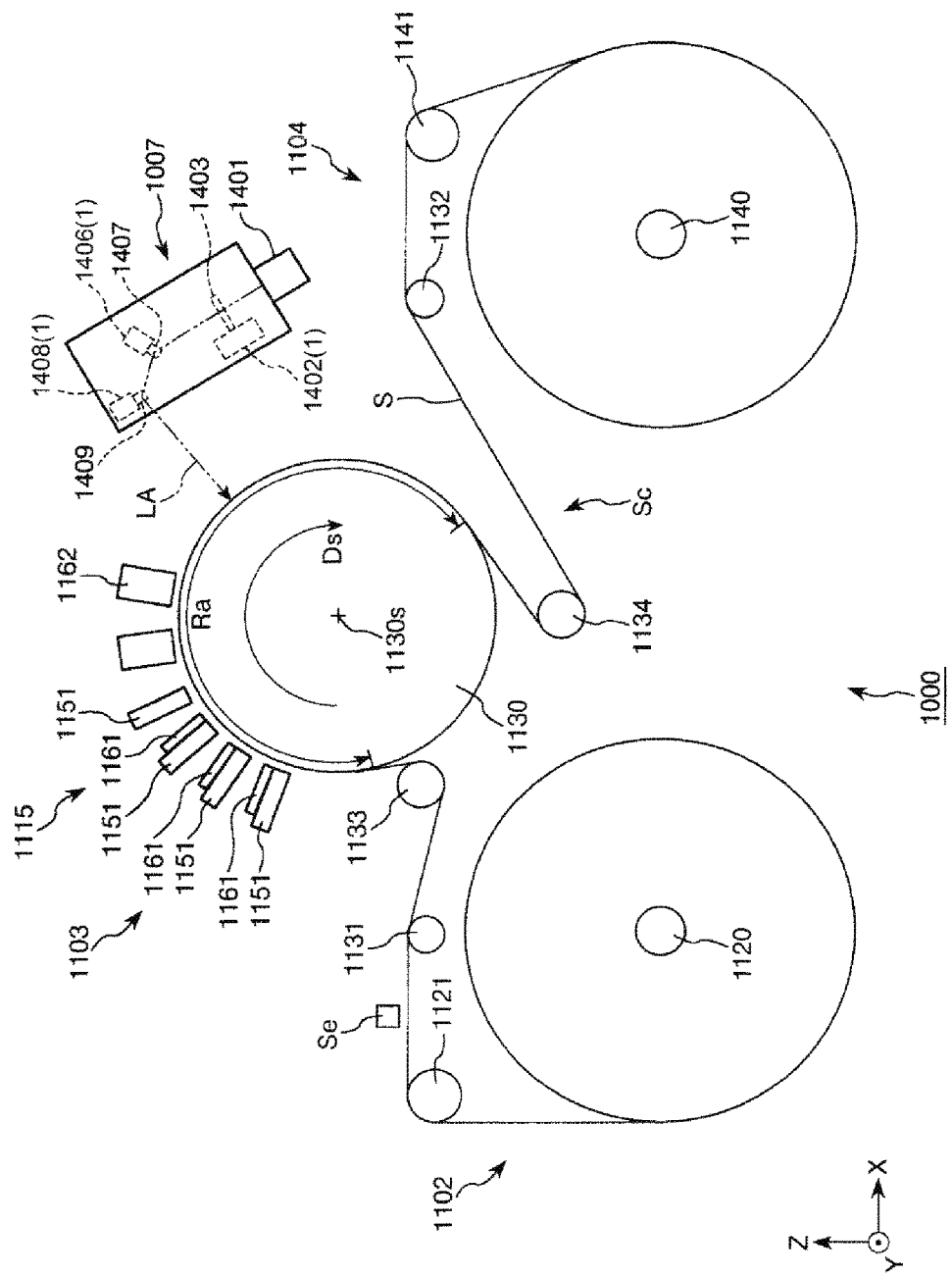
FIG. 19 is a diagram showing a schematic configuration of a printer according to an embodiment of the invention.

FIG. 19 is a diagram showing a schematic configuration of a printer according to an embodiment of the invention.

A printer 1000 shown in FIG. 19 is a label printing apparatus including a drum-like platen. In the printer 1000, for example, paper-based or film-based one sheet S (web), both ends of which are wound on a let-out shaft 1120 and a winding shaft 1140 in a shape of a roll functioning as a recording medium, is stretched and suspended between the let-out shaft 1120 and the winding shaft 1140. The sheet S is conveyed from the let-out shaft 1120 to the winding shaft 1140 along a conveying path Sc stretched and suspended in this way. The printer 1000 is configured to eject functional liquid to the sheet S conveyed along the conveyance path Sc to record (form) an image on the sheet S.

As a schematic configuration, the printer 1000 includes a let-out section 1102 configured to let out the sheet S from the let-out shaft 1120, a process section 1103 configured to record an image on the sheet S let out from the let-out section 1102, a laser scanner device 1007 configured to cut out the sheet S on which the image is recorded in the process section 1103, and a winding section 1104 configured to wind the sheet S on the winding shaft 1140.

The let-out section 1102 includes the let-out shaft 1120 on which an end of the sheet S is wound and a driven roller 1121 on which the sheet S drawn out from the let-out shaft 1120 is wound.

The process section 1103 causes, while supporting, with a platen drum 1130 functioning as a supporting section, the sheet S let out from the let-out section 1102, a recording head 1151 or the like disposed in a head unit 1115 disposed along the outer circumferential surface of the platen drum 1130 to perform processing as appropriate to record an image on the sheet S.

The platen drum 1130 is a cylindrical drum supported by a not-shown supporting mechanism to be rotatable around a drum axis 1130s. The sheet S conveyed from the let-out section 1102 to the winding section 1104 is wound on the platen drum 1130 from the rear surface (a surface on the opposite side of a recording surface) side. The platen drum 1130 supports the sheet S from the rear surface side over a range Ra in the circumferential direction while receiving a frictional force between the platen drum 1130 and the sheet S to be driven to rotate in a conveying direction Ds of the sheet S. In the process section 1103, driven rollers 1133 and 1134 configured to fold back the sheet S on both sides of a section for winding on the platen drum 1130 are provided. Driven rollers 1121 and 1131 and a sensor Se are provided between the let-out shaft 1120 and the driven roller 1133. Driven rollers 1132 and 1141 are provided between the winding shaft 1140 and the driven roller 1134.

The process section 1103 includes the head unit 1115. Four recording heads 1151 corresponding to yellow, cyan, magenta, and black are provided in the head unit 1115. The recording heads 1151 are opposed to the surface of the sheet S wound on the platen drum 1130 with a slight clearance (platen gap) apart from the surface. The recording heads 1151 eject functional liquids having colors corresponding to the recording heads 1151 from nozzles with an inkjet method. The recording heads 1151 eject the functional liquids on the sheet S conveyed in the conveying direction Ds, whereby a color image is formed on the surface of the sheet S.

As the functional liquids, UV (ultraviolet) inks (photo-setting inks), which are hardened by irradiation of an ultraviolet ray (light) is used. Therefore, first UV light sources 1161 (light irradiating sections) are provided among the plurality of recording heads 1151 of the process section 1103 in order to provisionally harden the UV inks and fix the UV inks on the sheet S. Second UV light sources 1162 functioning as hardening sections for regular hardening are provided on a downstream side of the conveying direction Ds with respect to the plurality of recording heads 1151 (the head unit 1115).

The laser scanner device 1007 is provided to partially cut out or divide the sheet S on which the image is recorded. Laser light LA oscillated by a laser oscillator 1401 of the laser scanner device 1007 is irradiated on the sheet S, which is work, through a first lens 1403, a first mirror 1407, a second mirror 1409, and the like, the positions or the rotation positions (angles) of which are controlled by driving devices 1402, 1406, and 1408 including the encoders 1. In this way, an irradiation position of the laser light LA irradiated on the sheet S is controlled by the driving devices 1402, 1406, and 1408. The laser light LA can be irradiated in a desired position on the sheet S. A portion of the sheet S on which the laser light LA is irradiated is fused. The sheet S is partially cut out or divided.

As explained above, the printer 1000 includes the encoder 1. That is, the printer 1000 includes the encoder 1 including the marks 21 configured to turn around the turning axis and the imaging element 31 configured to image the marks 21. The encoder 1 detects a turning state around the turning axis using a signal output from the imaging element 31. The encoder 1 includes the telecentric optical system 30 disposed between the imaging element 31 and the marks 21. With such a printer 1000, since the telecentric optical system 30 (the image forming optical system) is disposed between the imaging element 31 and the marks 21, even if the distance between the marks 21 and the imaging element 31 fluctuates, it is possible to reduce a change in the image forming magnification on the imaging element 31. As a result, it is possible to reduce deterioration in the detection accuracy of the encoder 1.

The preferred embodiments shown in the figures are explained above. However, the invention is not limited to the embodiments. The components of the sections can be replaced with any components having the same functions. Any other components may be added. Two or more of the embodiments explained above may be combined.

A setting place of the encoder is not limited to the joint section explained in the embodiments and may be a joint section of any two arms that relatively turn.

In the embodiments, the number of robot arms is one, which is the number described in the embodiments. However, the number of robot arms is not limited to this and may be, for example, two or more. That is, the robot according to the embodiments may be, for example, a plural-arm robot such as a double-arm robot.

In the embodiments, the number of arms included in the robot arm is not limited to the number described in the embodiments. The number of arms may be, for example, three or more and five or less or may be seven or more.

The robot according to the embodiments is not limited to the robot fixedly set in a structure such as a building. The robot may be, for example, a leg-type walking (traveling) robot including leg sections.

The entire disclosure of Japanese Patent Application No. 2017-087981, filed Apr. 27, 2017 is expressly incorporated by reference herein.

What is claimed is:

1. A robot comprising:
a base;
a robot arm provided to be turnable around a turning axis with respect to the base; and
an encoder including a mark configured to turn around the turning axis according to the turning of the robot arm and an imaging element configured to image the mark, the encoder detecting a state of the turning of the robot arm using a signal output from the imaging element, wherein
the encoder includes a telecentric optical system disposed between the imaging element and the mark.

2. The robot according to claim 1, wherein the telecentric optical system is object-side telecentric.

3. The robot according to claim 1, wherein the telecentric optical system is bi-telecentric.

4. The robot according to claim 1, further comprising light source sections configured to irradiate lights on the mark from directions inclined with respect to an optical axis of the telecentric optical system.

5. The robot according to claim 4, wherein the light source sections are disposed in a ring shape around the optical axis.

6. The robot according to claim 1, wherein the mark is formed using a pigment.

7. The robot according to claim 1, wherein the mark is formed using unevenness.

8. The robot according to claim 1, wherein the encoder includes light transmissive coating that covers the mark.

9. The robot according to claim 1, wherein the mark is present on a surface of the base or the robot arm.

10. A robot comprising:
a robot arm including a first arm and a second arm provided to be turnable around a turning axis with respect to the first arm; and
an encoder including a mark configured to turn around the turning axis according to the turning of the second arm and an imaging element configured to image the mark, the encoder detecting a state of the turning of the second arm with respect to the first arm using a signal output from the imaging element, wherein
the encoder includes a telecentric optical system disposed between the imaging element and the mark.

11. The robot according to claim 10, wherein the telecentric optical system is object-side telecentric.

12. The robot according to claim 10, wherein the telecentric optical system is bi-telecentric.

13. The robot according to claim 10, further comprising light source sections configured to irradiate lights on the mark from directions inclined with respect to an optical axis of the telecentric optical system.

14. The robot according to claim 13, wherein the light source sections are disposed in a ring shape around the optical axis.

15. The robot according to claim 10, wherein the mark is formed using a pigment.

16. The robot according to claim 10, wherein the mark is formed using unevenness.

17. The robot according to claim 10, wherein the encoder includes light transmissive coating that covers the mark.

18. The robot according to claim 10, wherein the mark is present on a surface of the first arm or the second arm.

19. A printer comprising an encoder including a mark configured to turn around the turning axis and an imaging element configured to image the mark, the encoder detecting a state of the turning around the turning axis using a signal output from the imaging element, wherein the encoder includes a telecentric optical system disposed between the imaging element and the mark.

* * * * *